US009913298B2

(12) United States Patent
Venkatesan

(10) Patent No.: US 9,913,298 B2
(45) Date of Patent: Mar. 6, 2018

(54) METHODS AND APPARATUS TO ESTABLISH GROUPCAST WITH RETRIES SERVICE FOR WIRELESS COMMUNICATIONS OVER BRIDGED LINKS

(71) Applicant: Intel IP Corporation, Santa Clara, CA (US)

(72) Inventor: Ganesh Venkatesan, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 243 days.

(21) Appl. No.: 14/749,160

(22) Filed: Jun. 24, 2015

(65) Prior Publication Data
US 2016/0381716 A1 Dec. 29, 2016

(51) Int. Cl.
H04W 76/00 (2009.01)
H04W 76/06 (2009.01)
H04W 76/02 (2009.01)

(52) U.S. Cl.
CPC ........ *H04W 76/002* (2013.01); *H04W 76/027* (2013.01); *H04W 76/06* (2013.01)

(58) Field of Classification Search
CPC . H04W 76/002; H04W 76/027; H04W 76/06; Y02B 60/50
USPC ........................................................ 370/328
See application file for complete search history.

(56) References Cited

U.S. PATENT DOCUMENTS

2015/0172757 A1* 6/2015 Kafle .................. H04L 67/1044
725/81
2015/0236822 A1* 8/2015 Pirskanen ............. H04L 1/1812
370/329
2015/0373505 A1* 12/2015 Hsieh ...................... H04W 4/06
370/312

(Continued)

OTHER PUBLICATIONS

IEEE, "Draft Standard for Information Technology—Telecommunications and information exchange between systems—Local and metropolitan area networks—Specific requirements: Part 11: Wireless LAN Medium Access Control (MAC) and Physical Layer (PHY) Specifications," P802.11-REVmc/D4.0, Jan. 2015 (3730 pages). (Entire document submitted herewith for consideration, including pp. 1375-1378 and 1757-1767 related to Groupcast with Retries (GCR).).

(Continued)

*Primary Examiner* — Andrew Chriss
*Assistant Examiner* — Ellen Kirillova
(74) *Attorney, Agent, or Firm* — Hanley, Flight & Zimmerman, LLC

(57) ABSTRACT

A disclosed example method to setup a Groupcast with Retries service for use with wireless communications involves receiving an association response at a wireless station from an access point. The association response is responsive to a General Link capability of the wireless station sent in an association request from the wireless station to the access point. The example method also involves confirming a General Link and the Groupcast with Retries service between the wireless station and the access point based on the association response indicating that the access point has successfully associated the wireless station with the access point.

34 Claims, 13 Drawing Sheets

AP

(56) References Cited

U.S. PATENT DOCUMENTS

2016/0261430 A1* 9/2016 Lepp .................. H04L 12/4641

OTHER PUBLICATIONS

IEEE, "Draft Standard Telecommunications and information exchange between systems—Local and metropolitan area networks—Part 11: Wireless LAN Medium Access Control (MAC) and Physical Layer (PHY) Specifications—Amendment 4: Enhancements for Transit Links Within Bridged Networks," P802.11ak/D1.0, Apr. 2015 (93 pages).

* cited by examiner

STA LINK MANAGER

AP LINK MANAGER

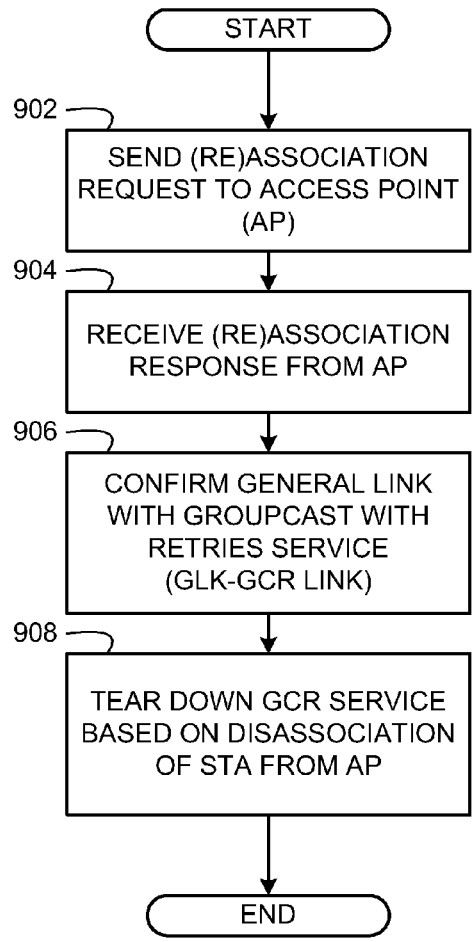
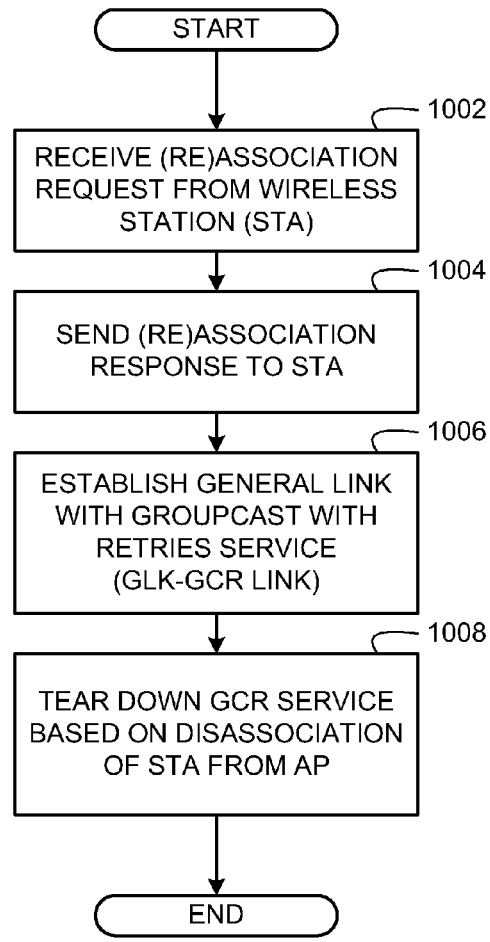
STA
FIG. 9
AP
FIG. 10

STA

AP

AP

STA

AP

METHODS AND APPARATUS TO ESTABLISH GROUPCAST WITH RETRIES SERVICE FOR WIRELESS COMMUNICATIONS OVER BRIDGED LINKS

FIELD OF THE DISCLOSURE

The present disclosure relates generally to wireless communications and, more particularly, to establishing Groupcast with Retries service for wireless communications over bridged links.

BACKGROUND

In wireless communications, devices can communicate wirelessly using different types of communication protocols. Some communication protocols are implemented in numerous elements of a communication infrastructure to enable complete, end-to-end communication paths. Other communication protocols are implemented in only some portions of a communication infrastructure to which those particular communication protocols pertain. For example, a wireless communication standard may define a transmit power control mechanism to be implemented in a wireless station (STA) (e.g., user equipment (UE), a wireless client, etc.) and in an access point (AP) so that wireless transmit power can be controlled to provide desired levels of wireless transmission performance between the STA and the AP. Other communication standards may define different mechanisms to be implemented in wired elements (e.g., routes, switches, servers, etc.) of a communication infrastructure. In this manner, many standards are used in combination across an entire end-to-end communication path to enable exchanging data across such communication paths.

When communicating across networks, such as in wireless communications over bridged links, STAs can send unicast transmissions, multicast transmissions, or broadcast transmissions across different networks. A unicast transmission is a transmission that is addressed to a particular single recipient device. For example, to send a unicast packet, a transmitting STA specifies the identity (e.g., an Internet protocol (IP) address, a media access control (MAC) address, etc.) of the intended recipient device. The unicast packet is then handled by numerous network elements across a communication path in a manner consistent with a standard-defined unicast packet transmission mechanism to deliver the unicast packet to the intended receiving device.

A multicast transmission is a transmission that is addressed to numerous particular devices. For example, to send a multicast packet, a transmitting STA specifies the identities (e.g., numerous particular IP addresses, MAC addresses, etc.) of the intended recipient devices. The multicast packet is then handled by numerous network elements across a communication path in a manner consistent with a standard-defined multicast packet transmission mechanism to deliver the multicast packet to the intended recipient devices.

A broadcast transmission is a transmission that is not addressed to any particular recipient device. Instead, a broadcast transmission is intended to be received by all client devices in, for example, a particular network domain. For example, to send a broadcast packet, a transmitting STA provides the transmission with a broadcast identifier (e.g., a value that identifies the packet as a broadcast transmission). The broadcast packet is then handled by numerous network elements across a communication path in a manner consistent with a standard-defined broadcast packet transmission mechanism to deliver the broadcast packet to the intended recipient devices.

BRIEF DESCRIPTION OF THE DRAWINGS

FIG. 9 is an example flow diagram representative of computer readable instructions that may be executed to implement the example STA link manager apparatus of FIG. 7 in the STA of FIGS. 1 and 2 to establish a GLK-GCR link between the STA and the AP of FIGS. 1 and 2 when the STA becomes associated with the AP and to tear down the GLK-GCR link when the STA is disassociated from the AP.

FIG. 10 is an example flow diagram representative of computer readable instructions that may be executed to implement the example AP link manager apparatus of FIG. 8 in the AP of FIGS. 1 and 2 to establish a GLK-GCR link between the AP and the STA of FIGS. 1 and 2 when the STA becomes associated with the AP and to tear down the GLK-GCR link when the STA is disassociated from the AP.

DETAILED DESCRIPTION

Figure 1:
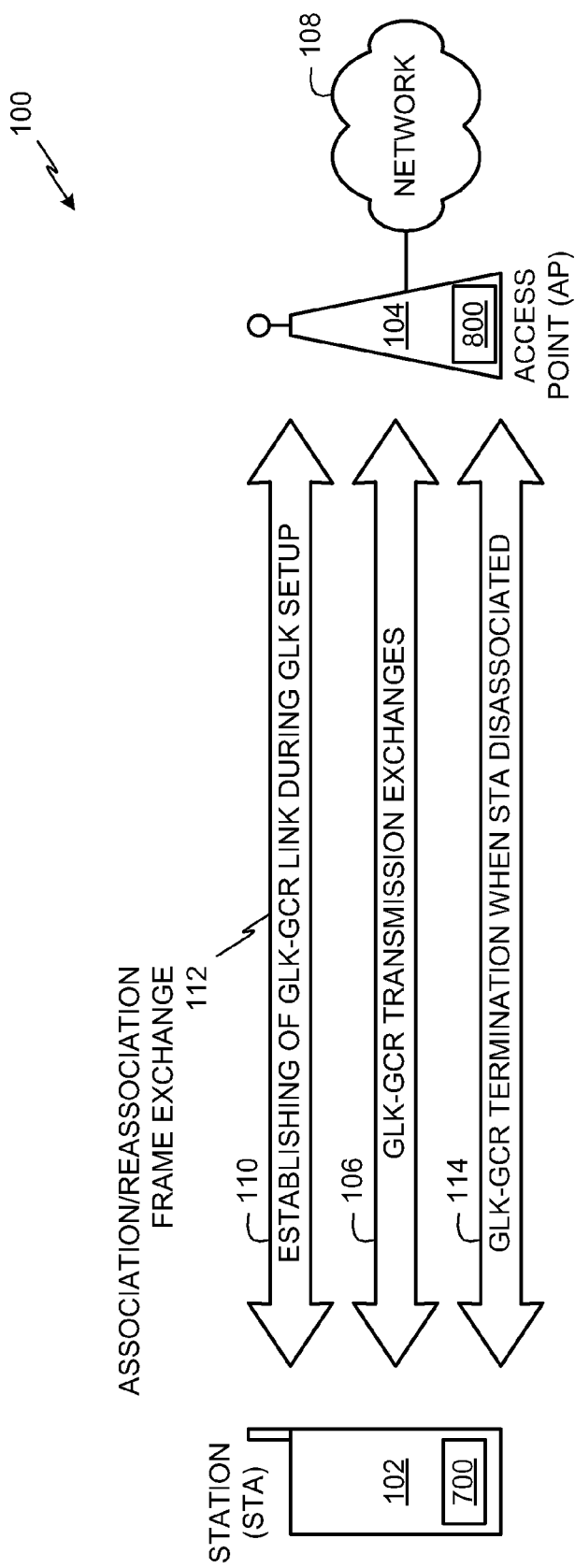
FIG. 1 is an example wireless station (STA) and an access point (AP) that use a General Link (GLK) with Groupcast with Retries (GCR) service (GLK-GCR) to exchange wireless communications.

Examples disclosed herein may be used to increase reliability of multicast transmissions in wireless communications over bridged links. Multicast transmissions transmit packets simultaneously to numerous specified devices. For example, to send a multicast packet, a wireless station (STA) specifies a multicast value in the packet to identify it as a multicast packet destined to a plurality of specific receiving devices. Such a multicast value may be a Multicast Destination media access control (MAC) address (i.e., a Groupcast MAC address) that represents the MAC addresses of all the devices that are members of a particular multicast group (e.g., a multicast group that the devices have explicitly joined). In this manner, a communication system can identify the multicast packet as needing to be handled in accordance with multicast transmission procedures to deliver the multicast packet to the specified receiving devices of the multicast group. Bridged links are used to communicate across networks such as networks implementing corresponding IEEE (Institute of Electrical and Electronics Engineers) 802 standards. For example, a bridged link may traverse a wireless, Wi-Fi link implemented in accordance with the IEEE 802.11 standard, and a wired Ethernet link implemented in accordance with the IEEE 802.1 standard.

In wired Ethernet networks many devices have multiple Ethernet ports. When a packet is received via one of the Ethernet ports of a device, and the device does not know the destination of the packet (e.g., the device cannot resolve the destination of the packet), the device sends (e.g., forwards) the packet to all other Ethernet ports (but not to the Ethernet port via which the packet was received at the device). For instances in which one of the Ethernet ports on the device is an IEEE 802.11 Wi-Fi port, the packet forwarded to the Wi-Fi port is sent to the access point (AP) with which this Wi-Fi port is associated (assuming that the Wi-Fi port is active and has an association). When the AP receives the packet, the AP sends (e.g., forwards) the packet to all associated STAs (including the device that forwarded the packet to the AP) if the AP cannot determine the destination of the packet. When using wireless communications over bridged links, this difference in behavior between wired Ethernet ports (do not forward an unknown-destination-packet to a port from which the unknown-destination-packet was received) and Wi-Fi Ethernet ports (do forward an unknown-destination-packet to a port from which the unknown-destination-packet was received) causes unnecessary flooding in the network and significant settling times before floods of packets cease.

General Link (GLK) links, described in connection with examples disclosed herein, may be used with IEEE 802.11 communications to substantially decrease or eliminate packet flooding in wireless communications over bridged links such as links across wired Ethernet ports and wireless Wi-Fi Ethernet ports. For example, GLK links may be used in the IEEE 802.11 wireless Wi-Fi domain to communicate to endpoints that are in the IEEE 802.1 wired domain or in other IEEE 802.11 wireless Wi-Fi domains (e.g., where the two IEEE 802.11 domains are connected together via one or more IEEE 802.1 wired bridges). However, without providing a GLK link with reliability when the GLK link is established, the GLK link cannot complete Address Resolutions in a timely fashion due to the flooding of packets created by the manner in which Wi-Fi Ethernet ports handle packets having unknown destinations (e.g., by forwarding an unknown-destination-packet back to the port from which the unknown-destination-packet was received). Address Resolution is used to map an Internet protocol (IP) address to a physical machine address (e.g., a MAC address).

Examples disclosed herein enable establishing reliability for GLK links as soon as the GLK links are established by implicitly establishing a Groupcast with Retries (GCR) service during GLK link setup. For example, in examples disclosed herein, a GCR service is established between an AP and a STA for multicast addresses of a multicast group to be used so that multicast transmissions to the multicast group members are deemed reliable. A GCR service may be used with both non-bridged links (e.g., IEEE 802.1 wired links), and bridged links spanning across IEEE 802.1 wired and IEEE 802.11 wireless domains. When used in connection with a non-bridged link, GCR service is explicitly setup using a separate frame exchange after the non-bridged link is already established. However, GLK links used with bridged links require reliability as soon as they are established to decrease the amount of flooding of packets created by the manner in which Wi-Fi Ethernet ports handle packets having unknown destinations (e.g., by forwarding an unknown-destination-packet back to the port from which the unknown-destination-packet was received). For example, when a node receives a packet having an unresolved destination address, the node forwards the packet to all of its ports for receipt by numerous other connected nodes. In this manner, other connected nodes can perform an address resolution process in an attempt to resolve the destination address. Without reliability in a GLK link, one or more nodes that could successfully perform address resolution may not receive the packet and, thus, delay successful address resolution. Thus, the destination address of the packet will go unresolved and the packet will continue to flood the network until some subsequent packet to the same destination address is finally received at the one or more nodes that can resolve the destination address. However, by making a GLK link reliable as soon as it is established, the reliability feature enables increasing the likelihood that any node capable of resolving a destination address will more quickly receive a packet to the destination address so that the amount of flooding of the network by the packet is substantially decreased. This immediate need for reliability with GLK links provides no opportunity for GCR service setup using the same type of separate frame exchange technique used to setup GCR service for already established non-bridged links. Examples disclosed herein enable establishing GCR service in a manner that is implicit to the setup of a GLK link to form a GLK-GCR link that has reliability provided by the GCR service as soon as the GLK link is established.

In addition, when used with non-bridged links, GCR service is tied to a specific multicast address. Since GCR service can be established for non-bridged links after the non-bridged links are already setup, new GCR services for different multicast addresses can be established at any time during the life of a non-bridged link. However, since a GLK link requires reliability as soon as the GLK link is established, new GCR services cannot be established over the life of a GLK link whenever a different multicast address is to be used. As such, examples disclosed herein also enable establishing a GLK-GCR link having a GCR service that is useful for a plurality of multicast addresses on the same GLK link. For example, when an AP receives an association request to establish a GLK link between the AP and an STA, the AP creates multiple Synthetic Receiver Addresses (SYN-RAs). Each SYNRA identifies numerous intended recipient devices using a single receiving address (RA) value to facilitate a multicast transmission to the numerous intended recipient devices based on a single SYNRA. As such, multiple multicast addresses in the form of SYNRAs can be assigned by the AP to the GLK-GCR link established between the AP and the STA.

Examples disclosed herein enable setting up a GCR service in wireless communications over bridged links when a GLK link is established between a STA and an AP, and to tear down the GCR service when the GLK is no longer established between the STA and the AP. In this manner, GCR service setup is implicit to GLK link establishment so that multicast packet transmissions from an STA are deemed reliable as soon as establishing of the GLK link is complete.

Although examples disclosed herein are described in connection with IEEE 802.11 communication standards, examples disclosed herein may alternatively or additionally be implemented in connection with any other communication standard including, for example, Bluetooth, GSM (Global System for Mobile communications), GPRS (General Packet Radio Service), CDMA (Code Division Multiple Access), TDMA (Time Division Multiple Access), LTE (Long-Term Evolution), etc.

FIG. 1 is an example wireless communication system 100 that includes a wireless station (STA) 102 in communication with an access point (AP) 104 via a General Link (GLK) with Groupcast with Retries (GCR) service (a GLK-GCR link) to exchange wireless communications 106. In the illustrated example, the AP 104 forms a wireless local area network (WLAN) to provide the STA 102 (and other STAs) access to a network 108 via wireless communications between the STA 102 and the AP 104. For example, the STA 102 is provided with one or more antennas and the AP 104 is provided with one or more antennas to facilitate transmitting and/or receiving wireless communications. In the illustrated example, the STA 102 and the AP 104 use wireless communications based on IEEE 802.11 standards over bridged links with one or more IEEE 802.1 domains. However, examples disclosed herein may alternatively be implemented using other communication standards as noted above to communicate between any two wireless devices.

A GLK is a General Link that is useful for STAs (e.g., AP STAs such as the AP 104 and non-AP STAs such as the STA 102) to transmit wireless communications over bridged links using unicast, multicast, and/or broadcast transmissions. For example, to transmit information to the AP 104, the STA 102 can request to associate with the AP 104 and establish a GLK link with the AP 104. In this manner, when the STA 102 and the AP 104 are associated, the STA 102 and the AP 104 can use the GLK link to exchange wireless communications over bridged links. The GLK link is established between the STA 102 and the AP 104 until the STA 102 becomes disassociated from the AP 104. At the time of disassociation, the STA 102 and the AP 104 tear down the GLK link.

A GCR service is a Groupcast with Retries service that increases reliability of multicast transmissions between STAs and APs by repeating transmissions of information that is initially transmitted using multicast. In examples disclosed herein, the GCR service is available in two modes, namely an unsolicited retransmission mode and a block acknowledge (BlockACK) mode. In the unsolicited retransmission mode, a multicast transmission is retransmitted by a transmitting device (e.g., the AP 104) one or more times as unsolicited multicast retransmissions to increase the likelihood that intended recipient devices (e.g., the STA 102) successfully receive the multicast transmission. In Block-ACK mode, a packet from an initial multicast transmission is retransmitted by a transmitting device (e.g., the AP 104) as a unicast transmission only to specified recipient devices (e.g., the STA 102) from which the transmitting device has not received an acknowledgement (ACK) indicating successful receipt of the initial multicast transmission. In some examples, BlockACK mode is used for immediate acknowledgement in which an originating device (e.g., the AP 104) expects to receive an immediate acknowledgment from a recipient device (e.g., the STA 102) after each multicast transmission. In some examples, BlockACK mode is used in a delayed acknowledgment mode in which an originating device (e.g., the AP 104) expects to receive a bitmap of acknowledgments from an intended recipient device (e.g., the STA 102) that represents a block of multicast transmissions and specifies which of the multicast transmissions were not received by a corresponding intended recipient device. In this manner, a transmitting device can identify which packets of initial multicast transmissions should be retransmitted to the intended recipient device as unicast transmissions. As such, the GCR service is useful for use by STAs (e.g., the STA 102) and APs (e.g., the AP 104) to increase reliable delivery of information in multicast transmissions.

The selection of unsolicited retransmission mode or BlockACK mode depends on the application that generates the multicast traffic, the size of the multicast group, and/or other factors. For example, video streaming uses voluminous amounts of large packets. Using the unsolicited retransmission mode to repeatedly retransmit such a significant amount of large packets for purposes of providing reliability may not be feasible due to limited amounts of available bandwidth. As such, for video streaming applications, it may be relatively better to select BlockACK mode instead of unsolicited retransmission mode because BlockACK mode retransmits packets only to specified receiving devices that did not acknowledge receipt of previous multicast packets. However, when the size of a multicast group is significantly large, it may be too time consuming to request and receive block acknowledgements from such a large number of devices. In such instances, it may be relatively better to select unsolicited retransmission mode instead of Block-ACK mode because unsolicited retransmission mode does not rely on acknowledgments of receipt of packets from intended recipient devices.

In the illustrated example of FIG. 1, the STA 102 and the AP 104 establish a GLK-GCR link therebetween. The STA 102 of the illustrated example includes a STA link manager 700 described below in connection with FIG. 7 to establish and manage GLK-GCR links at the STA 102. In addition, the AP 104 of the illustrated example includes an AP link manager 800 described below in connection with FIG. 8 to establish and manage GLK-GCR links at the AP 104. Unlike prior techniques of establishing a GCR service that require using separate frame exchanges between a STA and AP after the STA is already associated with the AP, examples disclosed herein are useful to establish a GCR service in a manner that is implicit during an association/reassociation frame exchange that is used to establish a GLK link between the STA 102 and the AP 104. For example, the GCR service may be established based on GLK and GCR capabilities of the STA 102 and the AP 104 identified in the association/reassociation frame exchange. That is, using examples disclosed herein makes GCR service setup part of the association/reassociation process between the STA 102 and the AP 104 so that a GLK-GCR link is established during (e.g., concurrently with) association/reassociation of the STA 102 with the AP 104. In this manner, it is not necessary to use a GCR service setup frame exchange separate from the association/reassociation frame exchange to establish a GCR service after a GLK link is already established between a STA and AP. As such, examples disclosed herein are useful to reduce wireless transmissions between STAs and APs when establishing GLK-GCR links.

Reducing wireless transmissions is useful to conserve battery power in battery-operated wireless devices. Power conservation is typically a significant design goal of engineers when designing wireless devices, software for wireless devices, and/or firmware for wireless devices. For example, every time a wireless transmission is made by a wireless device, a radio transmitter of the wireless device consumes a substantial amount of power to ensure that a sufficiently powerful radio frequency (RF) signal is emitted so that the wireless transmission is strong enough to be detected by a receiving device such as the AP 104. As such, each emitted wireless transmission consumes battery power, which over time reduces the useful battery life of a wireless device. Thus, reducing wireless transmissions increases useful battery life of wireless devices. Reducing wireless transmissions using examples disclosed herein also conserves battery power of wireless devices by reducing the amount of processing that needs to be performed by the wireless devices. For example, when information is wirelessly communicated by a wireless device, the wireless device uses processing resources to generate frames, messages, and/or any other information delivery units used to send wireless transmissions. Such processing resources consume battery power, which over time reduces the useful battery life of a wireless device. As such, using examples disclosed herein enables reducing battery power consumption in battery-operated wireless devices at least by reducing wireless transmissions and reducing the use of processing resources, which in turn enables maintaining battery charge of wireless devices so that such wireless devices can operate longer between battery charges and/or battery replacements.

Reducing wireless transmissions using examples disclosed herein to establish GLK-GCR links is also useful to reduce use of RF bandwidth and network resources. For example, when a wireless device (e.g., the STA 102) emits a wireless transmission, RF bandwidth is used to transmit the wireless transmission and a receiving device (e.g., the AP 104) uses processing resources to process the wireless transmission. Decreasing wireless transmissions allows RF bandwidth to remain available for other uses such as for transmissions by other wireless devices. In addition, network resources of network devices such as the AP 104 can be more readily available for other uses such as processing transmissions by other wireless devices. Accordingly, examples disclosed herein enable more efficient use of RF bandwidth and network resources which can in turn decrease network congestion and facilitate servicing more wireless clients at network access points.

The illustrated example of FIG. 1 shows an example of establishing a GLK-GCR link during GLK link setup 110 using an example association/reassociation frame exchange 112 so that a GCR service is available for use with wireless communications over bridged links between the STA 102 and the AP 104 via a GLK link when the GLK link is established. In this manner, GCR service is setup concurrently with GLK link setup. That is, setup of the GCR service is implicit or part of the GLK setup procedure during the association/reassociation frame exchange 112 so that it is not necessary to use a GCR service setup frame exchange to establish a GCR service separate from the association/reassociation frame exchange used to establish a GLK link.

After a GLK-GCR link is established between the STA 102 and the AP 104, GLK-GCR transmission exchanges can be used between the STA 102 and the AP 104 to increase reliability of multicast transmissions by sending redundant transmissions of multicast information to increase the likelihood that the STA 102 receives information transmitted by the AP 104. In the illustrated example, GLK-GCR link termination occurs when the STA 102 is disassociated 114 from the AP 104. That is, the STA 102 and the AP 104 tear down the GLK-GCR link based on detecting disassociation of the STA 102 from the AP 104 so that a separate teardown frame exchange is not necessary between the STA 102 and the AP 104 to tear down the GLK-GCR link.

Figure 2:
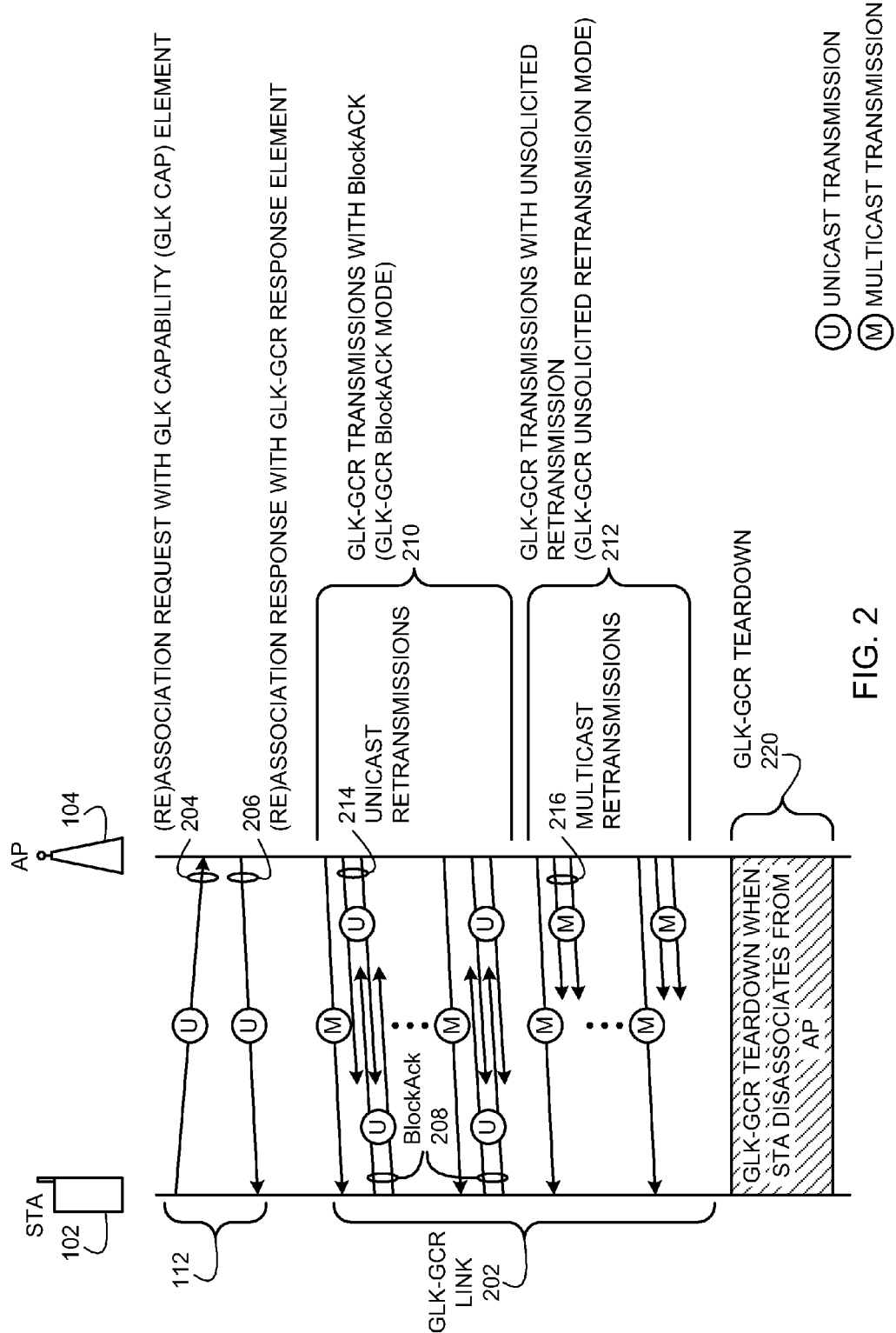
FIG. 2 is an example communication flow between the example STA and AP of FIG. 1 to establish, use, and tear down a GLK-GCR link.

FIG. 2 is an example communication flow between the example STA 102 and the example AP 104 of FIG. 1 to establish, use, and tear down a GLK-GCR link 202 between the STA 102 and the AP 104. In the illustrated example, the association/reassociation frame exchange 112 of FIG. 1 is shown in more detail in the illustrated example of FIG. 2 as a (re)association (i.e., association/reassociation) request 204 sent by the STA 102 to the AP 104, and a (re)association response 206 sent by the AP 104 to the STA 102. An association in the illustrated example is used when the STA 102 is not currently associated with an AP. Association occurs between the STA 102 and the AP 104 when the AP 104 has accepted to be associated with the STA 102, has allocated resources and/or memory to communicate with the STA 102, and has synchronized with a radio of the STA 102 to receive frames from the STA 102 and to transmit frames to the STA 102. A reassociation in the illustrated example is used when the STA 102 is already associated with an AP and is seeking to associate with another AP, in which case the STA 102 disassociates from the current AP and reassociates with the other AP. In the illustrated example, the STA 102 sends the (re)association request 204 to the AP 104 after the STA 102 has discovered the AP 104 by, for example, receiving a beacon (e.g., during passive scanning in a network discovery phase) or a probe response (e.g., during active scanning in a network discovery phase) from the AP 104. In the illustrated example of FIG. 2, a 'U' label denotes a unicast transmission, and a 'M' label denotes a multicast transmission.

In the illustrated example of FIG. 2, the (re)association request 204 is a (re)association request with a GLK capability (GLK CAP) element that indicates the GLK capabilities of the STA 102. For example, the GLK capabilities of the STA 102 indicate whether the STA 102 supports a GLK link and includes a GLK-GCR element (e.g., the GLK-GCR mode parameter 310 of FIG. 3) to indicate whether the STA 102 supports a GCR service. The (re)association response 206 of the illustrated example is a (re)association response with a GLK-GCR response element (e.g., the GLK-GCR mode parameter 310) that indicates a type of GCR service to be supported by the AP 104 for the GLK-GCR link 202.

In the illustrated example, when the AP 104 receives the (re)association request 204 from the STA 102, and the AP 104 supports a GLK-GCR mode, the AP 104 associates the STA 102 with the AP 104 by, for example, adding a MAC address of the STA 102 in an association table of the AP 104. When the example AP 104 performs this association, the GLK link and GCR service are established concurrently by the AP 104 such that setup of the GLK-GCR link 202 is an implicit part of the association/reassociation procedure between the STA 102 and the AP 104 without needing a separate explicit frame exchange to establish a GCR service between the STA 102 and the AP 104. In the illustrated example, the AP 104 sends the (re)association response 206 to the STA 102 to confirm the association and that the GLK-GCR link 202 is established using a GLK-GCR mode indicated in the (re)association response 206.

In the illustrated example, the AP 104 supports an example GLK-GCR block acknowledge (BlockACK) mode 210 and an example GLK-GCR unsolicited retransmission mode 212. Although the (re)association response with GLK-GCR response element frame 206 sent by the AP 104 to the STA 102 indicates either the example GLK-GCR Block-ACK mode 210 or the example GLK-GCR unsolicited retransmission mode 212, example transmissions of both of the example GLK-GCR BlockACK mode 210 and the example GLK-GCR unsolicited retransmission mode 212 are shown in FIG. 2.

In the example GLK-GCR BlockACK mode 210, the AP 104 retransmits information from an initial multicast transmission as unicast retransmissions 214 only to specific receiving devices (e.g., the STA 102) from which the AP 104 does not receive a block acknowledgement (BlockACK) 208 indicating successful receipt of the initial multicast transmission. In the illustrated example, when the GLK-GCR BlockACK mode 210 is used, there is no need for an explicit BlockACK setup frame exchange. For example, in prior techniques, an Add BlockACK (ADDBA) frame exchange is used between STAs and APs to establish the GLK-GCR BlockACK mode 210. In such prior techniques, an ADDBA request frame is transmitted by a transmitter (e.g., an AP) of quality of service (QoS) data type frames, and an ADDBA response frame is transmitted by a recipient of the QoS data type frames. Unlike such prior techniques, examples disclosed herein do not require use of separate explicit frame exchanges to establish the GLK-GCR BlockACK mode 210. Instead, the GLK-GCR BlockACK mode 210 is established as part of the association/reassociation frame exchange 112 when the GLK-GCR link 202 is established.

In the example GLK-GCR unsolicited retransmission mode 212, the AP 104 retransmits information from an initial multicast transmission one or more times as unsolicited multicast retransmissions 216 to increase the likelihood that the STA 102 (and any other specified receiving devices) successfully receives the information sent in the initial multicast transmission. In some examples, the AP 104 transmits the unsolicited multicast retransmissions 216 in which a GCR Groupcast address is specified using a Synthetic Receiver Address (SYNRA). For example, a SYNRA identifies numerous intended recipient devices using a single receiving address (RA) value. In this manner, the example AP 104 can use a SYNRA to specify a group address (i.e., a multicast address) as a RA for numerous recipient devices (e.g., the STA 102 and any other recipient devices) that are intended to receive the multicast retransmissions 216. In some examples, the AP 104 can create numerous SYNRAs for use as multicast addresses, and assign those numerous SYNRAs to the GLK-GCR link 202 so that the GCR service of the GLK-GCR link 202 is useful for a plurality of multicast addresses. Any other suitable type of block or group addressing may be used by the AP 104 instead of or in addition to SYNRA to specify a group or block of recipient devices intended to receive the multicast retransmissions 216. Alternatively, if the multicast retransmissions 216 are not used (e.g., during the GLK-GCR transmissions with unsolicited retransmission mode), the AP 104 does not use SYNRA addresses, but instead sends a copy of data in separate unicast retransmissions 214 to separate receiving devices specified using individually addressed RAs.

In the illustrated example, the AP 104 sends the unicast retransmissions 214 and/or the multicast retransmissions 216 using MAC (Media Access Control) Service Data Units (MSDUs) or Aggregate MSDUs (A-MSDUs). In the illustrated example, the AP 104 uses MSDUs to communicate information to the STA 102 at Layer 2 (MAC Layer) of the Open Systems Interconnection (OSI) model. For example, the AP 104 may receive data at higher layers (e.g., Layers 3-7) of the OSI model from other network devices via the network 108 (FIG. 1) and convert the received information to an MSDU frame for transmission to the STA 102 using the lower Layer 2. In this manner, the AP 104 can employ an Ethernet protocol, which corresponds to Layers 1 and 2 of the OSI model, to communicate with the STA 102. Additionally or alternatively, the AP 104 can send the unicast retransmissions 214 and/or the multicast retransmissions 216 using MAC Protocol Data Units (MPDUs) in which frames are passed from the MAC layer (e.g., Layer 1 of the OSI model) to the physical (PHY) layer (e.g., Layer 1 of the OSI model). In some examples, the AP 104 aggregates multiple frames of data to transmit to the STA 102 in an aggregate MSDU (A-MSDU) or an aggregate MPDU (A-MPDU).

In the illustrated example, a GLK-GCR teardown 220 occurs when the STA 102 disassociates from the AP 104. That is, examples disclosed herein do not require an explicit frame exchange between the STA 102 and the AP 104 to tear down the GLK-GCR link 202. Instead, when the STA 102 of the illustrated example detects that it is disassociated from the AP 104, the STA 102 automatically tears down its end of the GLK-GCR link 202. Also, when the AP 104 of the illustrated example detects that it is disassociated from the STA 102, the AP 104 automatically tears down its end of the GLK-GCR link 202. Disassociation and detection of disassociation may occur in a number of ways. For example, disassociation between the STA 102 and the AP 104 may be explicit such as when a disassociation is intentionally caused by the STA 102 and/or the AP 104 using an explicit frame, or may be implicit such as when a STA 102 moves out of wireless communication range from the AP 104 and no longer sends frames to the AP 104. An example explicit disassociation involves the STA 102 sending the AP 104 a disassociation request to request disassociation from the AP 104, and the AP 104 responding by sending the STA 102 a disassociation response confirming the disassociation. Another example explicit disassociation involves the AP 104 sending the STA 102 an unsolicited disassociation that is used by the AP 104 to make the disassociation without the STA 102 requesting it. For example, the AP 104 may need to disassociate one or more STAs due to inactivity of those STAs, due to inability to handle all currently associated STAs, etc. An example implicit disassociation involves the STA 102 or the AP 104 detecting a timeout since the last time a frame was received by the other peer MAC entity (e.g., the other one of the associated STA 102 or AP 104). For example, when the STA 102 is moved out of wireless range of the AP 104, the STA 102 will detect a timeout since the last time it received a frame from the AP 104. Similarly, the AP 104 will detect a timeout since the last time it received a frame from the STA 102. In any case, when the STA 102 and the AP 104 detect a disassociation, they remove the associated peer MAC entity (e.g., the other one of the associated STA 102 or AP 104) from their association tables, and relinquish resources and memory allocations previously allocated to the now disassociated peer MAC entity.

Figure 3:
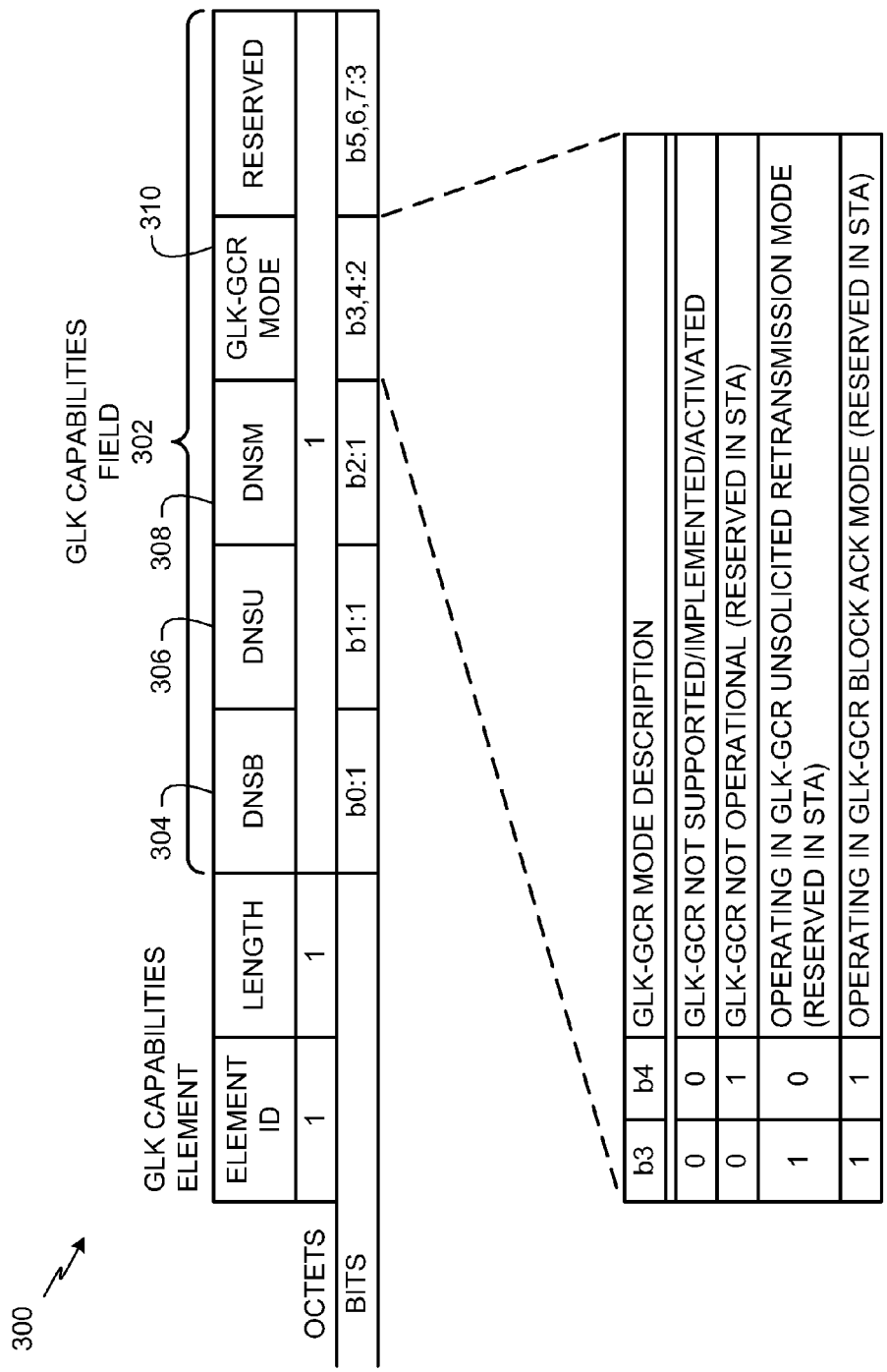
FIG. 3 is an example GLK capabilities element for use by the STA and the AP of FIGS. 1 and 2 to indicate GLK capabilities and to specify GLK-GCR modes for use with GLK-GCR links.

FIG. 3 is an example GLK capabilities element 300 for use by the STA 102 and the AP 104 of FIGS. 1 and 2 to indicate GLK capabilities and to specify GLK-GCR modes (e.g., the GLK-GCR BlockACK mode 210 and/or the GLK-GCR unsolicited retransmission mode 212 of FIG. 2) for use with GLK-GCR links (e.g., the GLK-GCR link 202 of FIG. 2). By using the GLK capabilities element 300 of the illustrated example, the STA 102 can inform the AP 104 of its GLK capabilities and its GLK-GCR link capabilities at the same time in a single frame during the association/reassociation frame exchange 112. In addition, the AP 104 can also inform the STA 102 of its GLK capabilities and its GLK-GCR link capabilities at the same time in a single frame during the association/reassociation frame exchange 112. For example, when the STA 102 is requesting to associate/reassociate with the AP 104, the STA 102 sends the GLK capabilities element 300 in the (re)association request 204 so that the STA 102 can specify to the AP 104 its GLK capabilities and its ability to communicate via a GLK-GCR link. In the illustrated example, the GLK capabilities element 300 includes a GLK capabilities field 302 that identifies GLK capabilities specified in a DNSB flag 304, an example DNSU flag 306, and an example DNSM flag 308. The GLK capabilities field 302 also includes an example GLK-GCR mode parameter 310 to identify GLK-GCR link capabilities and/or modes.

The example DNSB flag 304 is used by a device transmitting the GLK capabilities element 300 (e.g., the STA 102 or the AP 104) to request that data MSDUs with a broadcast destination address (DA) not be sent to it. The example DNSU flag 306 is used by the device transmitting the GLK capabilities element 300 (e.g., the STA 102 or the AP 104) to request that data MPDUs with an individual address DA not be sent to it unless that address (e.g., a MAC address) has been registered by a Multiple MAC Registration Protocol (MMRP) frame from the device transmitting the GLK capabilities element 300. The MMRP Protocol is a data link layer (e.g., Layer 2 of the OSI model) protocol to register group MAC addresses (i.e., multicast addresses) on multiple switches. The example DNSM flag 308 is used by the device transmitting the GLK capabilities element 300 (e.g., the STA 102 or the AP 104) to request that data MPDUs with a non-broadcast group address DA (e.g., a multicast DA) not be sent to it unless that address (e.g., a MAC address) has been registered by a MMRP frame from the device transmitting the GLK capabilities element 300.

In examples disclosed herein, the GLK-GCR mode parameter 310 is used by a (re)association-requesting device (e.g., a device such as the STA 102 or the AP 104 that is requesting to associate with a (re)association-target device such as the other one of the STA 102 or the AP 104) that is requesting an association/reassociation to inform a (re)association-target device (e.g., the STA 102 or the AP 104) of the (re)association-requesting device's GLK capabilities and its ability to communicate via a GLK-GCR link. For example, the (re)association-requesting device provides the GLK-GCR mode parameter 310 for sending in the (re)association request 204 (FIG. 2) without setting bits of the GLK-GCR mode parameter 310 to specify a GLK-GCR mode. By including the GLK-GCR mode parameter 310 without specifying the GLK-GCR mode, the (re)association-requesting device informs the (re)association-target device that the (re)association-requesting device is able to communicate via a GLK-GCR link.

The example GLK-GCR mode parameter 310 of the illustrated example is used by the (re)association-target device to specify whether it will retransmit using the GLK-GCR BlockACK mode 210 or the GLK-GCR unsolicited retransmission mode 212. In the illustrated example of FIG. 3, the example GLK-GCR mode parameter 310 includes two bits (b3, b4). When the two bits of the GLK-GCR mode parameter 310 are set to b3=0, b4=0 by the (re)association-target device, the GLK-GCR mode parameter 310 specifies that a GLK-GCR type of link is not supported, implemented, or activated by the (re)association-target device. When the GLK-GCR mode parameter 310 is set to b3=0, b4=1 by the (re)association-target device, the GLK-GCR mode parameter 310 specifies that a GLK-GCR type of link is not operational. The b3=0, b4=1 bit combination in the GLK-GCR mode parameter 310 is not used by the (re)association-requesting device (e.g., the STA 102) and is, thus, a reserved bit combination in by the (re)association-target device. When the GLK-GCR mode parameter 310 is set to b3=1, b4=0 by the (re)association-target device, the GLK-GCR mode parameter 310 specifies that the (re)association-target device will use the GLK-GCR unsolicited retransmission mode 212. The b3=1, b4=0 bit combination in the GLK-GCR mode parameter 310 is not used by the (re)association-requesting device (e.g., the STA 102) and is, thus, a reserved bit combination in the (re)association-target device. When the GLK-GCR mode parameter 310 is set to b3=1, b4=1 by the (re)association-target device, the GLK-GCR mode parameter 310 specifies that the (re)association-target device will use the GLK-GCR BlockACK mode 210. The b3=1, b4=1 bit combination in the GLK-GCR mode parameter 310 is not used by the (re)association-requesting device (e.g., the STA 102) and is, thus, a reserved bit combination in the STA 102.

In examples disclosed herein, service primitives are used to define parameters for establishing different types of communications between devices. Example service primitives described below are defined in data structures for use by the STA 102 and/or the AP 104 to establish the GLK-GCR link 202 during association and/or reassociation frame exchanges using the (re)association request 204 and/or the (re)association response 206 of FIG. 2. The disclosed example service primitives are implemented using a MAC Sublayer Management Entity (MLME), which is an interface on top of an 802.11 layer (e.g., on top of Layer 2 (MAC Layer) and Layer 1 (PHY Layer) of the OSI model). The example service primitives described below are a set of primitives that provide statements defined as data structures with numerous elements for use by applications and operating systems (OSs) to access information and functions of association procedures to associate the STA 102 with the AP 104.

To request setup of a GLK-GCR link during initial association between the STA 102 and the AP 104, an MLME associate request (MLME-ASSOCIATE.request) service primitive data structure defines a GLK Capabilities parameter as shown below.

---

MLME-ASSOCIATE.request(
...
HT Capabilities,
GLK Capabilities,
VendorSpecificInfo
)

---

In the example MLME-ASSOCIATE.request service primitive above, the example GLK Capabilities parameter specifies GLK capabilities of the STA 102. In the illustrated example, the STA 102 provides the GLK Capabilities parameter in the example GLK capabilities field 302 of FIG. 3 of the (re)association request 204 of FIG. 2 during an association frame exchange.

Information corresponding to an intended association attempt with a specified peer MAC entity such as the STA 102 or the AP 104 may be reported by the 802.11 layer of a device to an application or an OS of the same device using an MLME associate confirm (MLME-ASSOCIATE.confirm) service primitive data structure. The MLME-ASSOCIATE.confirm service primitive is used to inform the application or OS of information or capabilities to be used by the 802.11 layer for an association, but does not confirm that the information has yet been communicated to a peer MAC entity in an association frame exchange. The MLME-ASSOCIATE.confirm service primitive defines a GLK Capabilities parameter and a GLK-GCR Response parameter as shown below.

---
MLME-ASSOCIATE.confirm(
...
HT Capabilities,
GLK Capabilities,
GLK-GCR Response,
VendorSpecificInfo
)
---

In the example MLME-ASSOCIATE.confirm service primitive above, the GLK Capabilities parameter specifies the GLK capabilities of an association-requesting device or association-target device (e.g., the STA 102 or the AP 104) when the association-requesting device or association-target device sends the (re)association request 204 or the (re)association response 206 of FIG. 2 to a target peer MAC entity (e.g., the STA 102 or the STA 104) during an association frame exchange. The GLK-GCR Response parameter specifies how the GLK-GCR link 202 will be configured to transmit data and to increase the reliability of multicast transmissions by using either the GLK-GCR BlockACK mode 210 or the GLK-GCR unsolicited retransmission mode 212. In the illustrated example, the GLK Capabilities parameter of the MLME-ASSOCIATE.confirm service primitive is provided by the AP 104 in the GLK Capabilities field 302 of FIG. 3 of the (re)association response 206 of FIG. 2 during an association frame exchange. In the illustrated example, the GLK-GCR Response parameter of the MLME.ASSOCIATE.confirm service primitive is provided by the AP 104 in the GLK-GCR mode parameter 310 in the (re)association response 206 during an association frame exchange.

To identify when a specific peer MAC entity (e.g., in the STA 102) is requesting association with a local MAC entity (e.g., in the AP 104), an MLME associate indication (MLME-ASSOCIATE.indication) service primitive data structure defines a GLK Capabilities parameter as shown below.

---
MLME-ASSOCIATE.indication(
...
HT Capabilities,
GLK Capabilities,
VendorSpecificInfo
)
---

In the example MLME-ASSOCIATE.indication service primitive above, the GLK Capabilities parameter specifies the GLK capabilities supported by the STA 102 when the STA 102 sends the (re)association response 206 of FIG. 2 to the AP 104 during an association frame exchange. In the illustrated example, the GLK Capabilities parameter of the MLME-ASSOCIATE.indication service primitive is provided by the STA 102 in the GLK Capabilities field 302 of FIG. 3 of the (re)association response 206 of FIG. 2 during an association frame exchange.

To send a response from one peer MAC entity such as the AP 104 to a specific peer MAC entity (e.g., the STA 102) that requested an association with the AP 104, an MLME associate response (MLME-ASSOCIATE.response) service primitive data structure defines a GLK Capabilities parameter and a GLK-GCR Response parameter as shown below.

---
MLME-ASSOCIATE.response(
...
HT Capabilities,
GLK Capabilities,
GLK-GCR Response,
VendorSpecificInfo
)
---

In the example MLME-ASSOCIATE.response service primitive above, the GLK Capabilities parameter specifies the GLK capabilities of the AP 104 when the AP 104 sends the (re)association response 206 of FIG. 2 to the STA 102 during an association frame exchange. The GLK-GCR Response parameter specifies how the GLK-GCR link 202 will be configured to transmit data and to increase the reliability of multicast transmissions by using either the GLK-GCR BlockACK mode 210 or the GLK-GCR unsolicited retransmission mode 212. In the illustrated example, the GLK Capabilities parameter of the MLME-ASSOCIATE.response service primitive is provided by the AP 104 in the GLK Capabilities field 302 of FIG. 3 of the (re)association response 206 of FIG. 2 during an association frame exchange. In the illustrated example, the GLK-GCR Response parameter of the MLME-ASSOCIATE.response service primitive is provided by the AP 104 in the GLK-GCR mode parameter 310 in the (re)association response 206 during an association frame exchange.

An example use of the MLME-ASSOCIATE service primitives involves an association-requesting device (e.g., the device such as the STA 102 or the AP 104 that is requesting to associate with an association-target device such as the other one of the STA 102 or the AP 104) invoking the MLME-ASSOCIATE.request service primitive. The MLME of the association-requesting device verifies that the parameters specified in the MLME-ASSOCIATE.request service primitive are all correct identified based on standard-defined parameters. If the MLME confirms that the parameters are correctly identified, the MLME constructs an IEEE 802.11 association request frame (e.g., the association request 204 of FIG. 2), and sends it over the air to the association-target device. After the successful transmission of the IEEE 802.11 association request frame, the MLME identifies a success code in an MLME-ASSOCIATE.confirm frame to indicate the successful transmission. However, if the parameters in the MLME-ASSOCIATE.request service primitive are not correctly identified, the MLME identifies a failure code in an MLME-ASSOCIATE.confirm frame to indicate that the parameters are incorrect. The MLME provides the MLME-ASSOCIATE.confirm frame to, for example, an application or OS (e.g., an entity external to the MLME) of the association-requesting device that submitted the MLME-ASSOCIATE.request service primitive to the MLME of the association-requesting device.

At the association-target device, when it receives the IEEE802.11 association request from the association-requesting device, the MLME of the association-target device verifies whether the IEEE 802.11 association request is correctly formatted in accordance with the IEEE 802.11 standard. If the IEEE 802.11 association request is correctly formatted, the MLME uses the MLME-ASSOCIATE.indication service primitive to provide the association request to an application or OS (e.g., an entity external to the MLME) to handle the request. Subsequently, the application or OS of the association-target device submits a MLME-ASSOCIATE.response to the MLME of the association-target device which causes the MLME to send an IEEE 802.11 association response frame (e.g., the association response 206 of FIG. 2) to the association-requesting device.

The following service primitives may be used during reassociation between the STA 102 and the AP 104. The following reassociation service primitives may be used in a manner similar to the use of the association service primitives described above, except that the reassociation service primitives are used during reassociation. For example, to request a reassociation to setup a GLK-GCR link with a specified new peer MAC entity (e.g., the AP 104), an MLME reassociate request (MLME-REASSOCIATE.request) service primitive data structure defines a GLK Capabilities parameter as shown below.

---
MLME-REASSOCIATE.request(
...
HT Capabilities,
GLK Capabilities,
VendorSpecificInfo
)
---

In the example MLME-REASSOCIATE.request service primitive above, the example GLK Capabilities parameter specifies GLK capabilities of the STA 102. In the illustrated example, the STA 102 provides the GLK Capabilities parameter in the example GLK Capabilities field 302 of FIG. 3 of the (re)association request 204 of FIG. 2 during a reassociation frame exchange.

Information corresponding to an intended reassociation attempt with a specified peer MAC entity such as the STA 102 or the AP 104 may be reported by the 802.11 layer of a device to an application or an OS of the same device using an MLME reassociate confirm (MLME-REASSOCIATE.confirm) service primitive data structure. The MLME-REASSOCIATE.confirm service primitive is used to inform the application or OS of information or capabilities to be used by the 802.11 layer for a reassociation, but does not confirm that the information has yet been communicated to a peer MAC entity in a reassociation frame exchange. The MLME-REASSOCIATE.confirm service primitive defines a GLK Capabilities parameter and a GLK-GCR Response parameter as shown below.

---
MLME-REASSOCIATE.confirm(
...
HT Capabilities,
GLK Capabilities,
GLK-GCR Response,
VendorSpecificInfo
)
---

In the example MLME-REASSOCIATE.confirm service primitive above, the GLK Capabilities parameter specifies the GLK capabilities of a reassociation-requesting device or reassociation-target device (e.g., the STA 102 or the AP 104) when the reassociation-requesting device or reassociation-target device sends the (re)association response 206 of FIG. 2 to the STA 102 during a reassociation frame exchange. The GLK-GCR Response parameter specifies how the GLK-GCR link 202 will be configured to transmit data and to increase the reliability of multicast transmissions by using either the GLK-GCR BlockACK mode 210 or the GLK-GCR unsolicited retransmission mode 212. In the illustrated example, the GLK Capabilities parameter of the MLME-REASSOCIATE.confirm service primitive is provided by the AP 104 in the GLK Capabilities field 302 of FIG. 3 of the (re)association response 206 of FIG. 2 during a reassociation frame exchange. In the illustrated example, the GLK-GCR Response parameter of the MLME.REASSOCIATE.confirm service primitive is provided by the AP 104 in the GLK-GCR mode parameter 310 in the (re)association response 206 during a reassociation frame exchange.

To identify when a specific peer MAC entity (e.g., in the STA 102) is requesting reassociation with a local MAC entity (e.g., in the AP 104), an MLME reassociate indication (MLME-REASSOCIATE.indication) service primitive data structure defines a GLK Capabilities parameter as shown below.

---
MLME-REASSOCIATE.indication(
...
HT Capabilities,
GLK Capabilities,
VendorSpecificInfo
)
---

In the example MLME-REASSOCIATE.indication service primitive above, the GLK Capabilities parameter specifies the GLK capabilities supported by the STA 102 when the STA 102 sends the (re)association response 206 of FIG. 2 to the AP 104. In the illustrated example, the GLK Capabilities parameter of the MLME-REASSOCIATE.indication service primitive is provided by the STA 102 in the GLK Capabilities field 302 of FIG. 3 of the (re)association response 206 of FIG. 2 during a reassociation frame exchange.

To send a response to a specific peer MAC entity (e.g., the STA 102) that requested a reassociation with the AP 104, an MLME reassociate response (MLME-REASSOCIATE.response) service primitive data structure defines a GLK Capabilities parameter and a GLK-GCR Response parameter as shown below.

---
MLME-REASSOCIATE.response(
...
HT Capabilities,
GLK Capabilities,
GLK-GCR Response,
VendorSpecificInfo
)
---

In the example MLME-REASSOCIATE.response service primitive above, the GLK Capabilities parameter specifies the GLK capabilities of the AP 104 when the AP 104 sends the (re)association response 206 of FIG. 2 to the STA 102 during a reassociation frame exchange. The GLK-GCR Response parameter specifies how the GLK-GCR link 202 will be configured to transmit data and to increase the reliability of multicast transmissions by using either the GLK-GCR BlockACK mode 210 or the GLK-GCR unsolicited retransmission mode 212. In the illustrated example, the GLK Capabilities parameter of the MLME-REASSOCIATE.response service primitive is provided by the AP 104 in the GLK Capabilities field 302 of FIG. 3 of the (re) association response 206 of FIG. 2 during a reassociation frame exchange. In the illustrated example, the GLK-GCR Response parameter of the MLME.REASSOCIATE.response service primitive is provided by the AP 104 in the GLK-GCR mode parameter 310 in the (re)association response 206 during a reassociation frame exchange.

Figure 4:
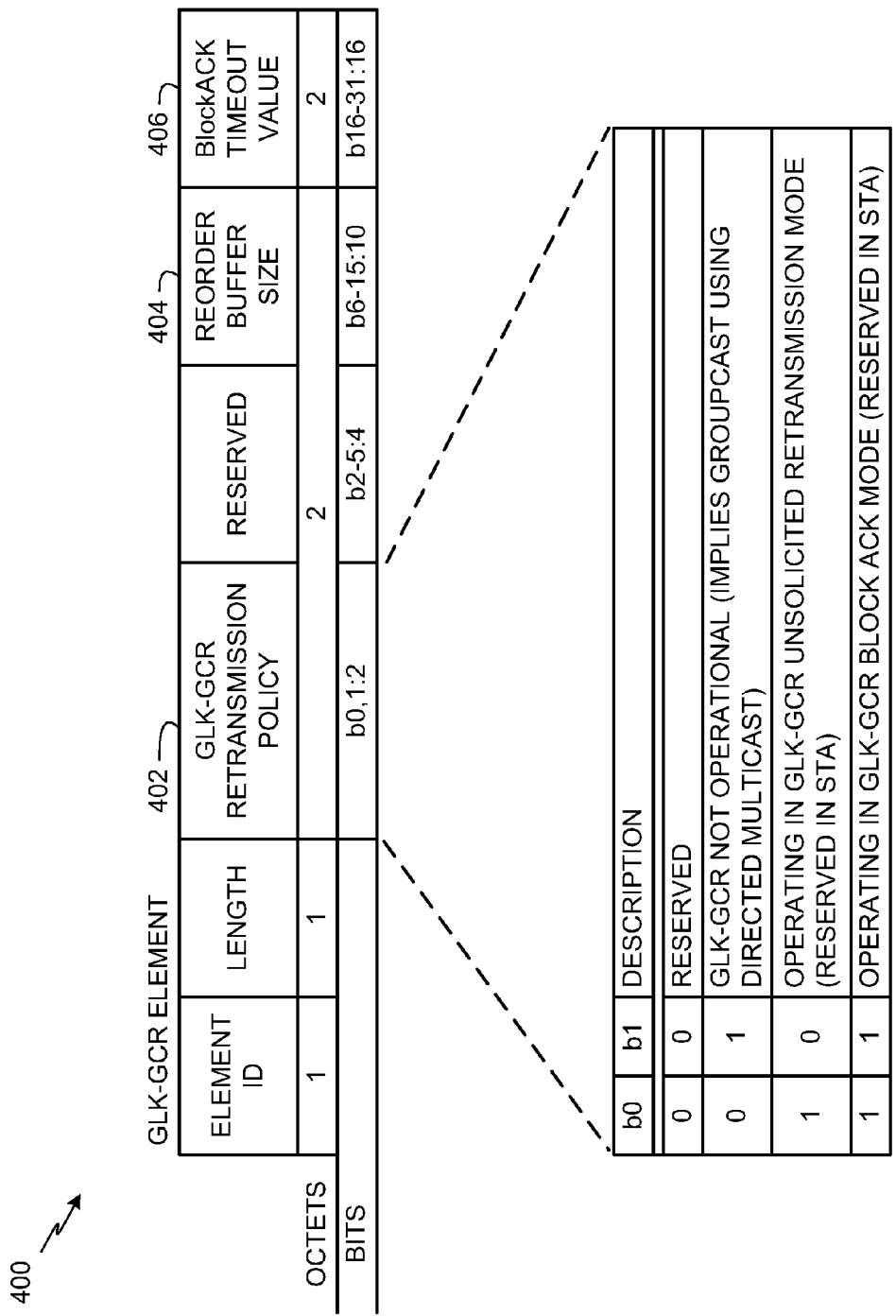
FIG. 4 is an example GLK-GCR element for use by the AP of FIGS. 1 and 2 to specify GLK-GCR parameters that are used when the AP uses a GLK to transmit Groupcast frames to the STA using the GLK-GCR link.

FIG. 4 is an example GLK-GCR element 400 for use by the AP 104 of FIGS. 1 and 2 to specify GLK-GCR parameters that are used when the AP 104 uses the GLK-GCR link 202 (FIG. 2) to transmit Groupcast frames to the STA 102. For example, GLK-GCR links disclosed herein may be configured for different types of reliability policies (e.g., the GLK-GCR BlockACK mode 210 or the GLK-GCR unsolicited retransmission mode 212 of FIG. 2) based on different types of uses (e.g., video streaming, file transfer, etc.) for the multicast transmissions. As such, after the GLK-GCR link 202 has been established based on the GLK-GCR mode parameter 310 in the GLK capabilities element 300 of FIG. 3, the AP 104 may use the example GLK-GCR element 400 to change the GLK-GCR retransmission policy to be different from the GLK-GCR mode previously identified in the GLK-GCR mode parameter 310. In this manner, after the STA 102 is already associated with the AP 104, a current GLK-GCR link between the STA 102 and the AP 104 can be re-configured between the STA 102 and the AP 104 based on the updated GLK-GCR retransmission policy identified in the GLK-GCR element 400 without needing to disassociate the STA 102 from the AP 104.

The example GLK-GCR element 400 includes a GLK-GCR retransmission policy field 402 having two bits (b0, b1). In the illustrated example, a first setting of b0=0, b1=0 for the GLK-GCR retransmission policy is reserved. In the illustrated example, the AP 104 sets the GLK-GCR retransmission policy field 402 to b0=0, b1=1 to indicate that the GLK-GCR link 202 is not operational. In some examples, this implies use of Groupcast using directed multicast in which the AP 104 sends unicast retransmissions to all of the intended recipient devices of the original multicast transmission. In the illustrated example, the AP 104 sets the GLK-GCR retransmission policy field 402 to b0=1, b1=0 to indicate that the GLK-GCR link 202 is operating in the GLK-GCR unsolicited retransmission mode 212 (FIG. 2). In the illustrated example, the AP 104 sets the GLK-GCR retransmission policy field 402 to b0=1, b1=1 to indicate that the GLK-GCR link 202 is operating in the GLK-GCR BlockACK mode 210 (FIG. 2).

The example GLK-GCR element 400 also includes a reorder buffer size field 404 and a BlockACK timeout value field 406. When the GLK-GCR retransmission policy field 402 is set to b0=0, b1=0, the reorder buffer size field 404 and the BlockACK timeout value field 406 are reserved because the GLK-GCR unsolicited retransmission mode 212 is selected. When the GLK-GCR retransmission policy field 402 is set to b0=1, b1=1, the reorder buffer size field 404 indicates the number of buffers used by the AP 104 to transmit the unicast retransmissions 214 (FIG. 2) on the GLK-GCR link 202 using the GLK-GCR BlockACK mode 210, and the BlockACK timeout value 406 indicates the amount of time that the AP 104 will wait to receive block acknowledgments from intended recipient devices before determining that a multicast transmission was not received by one or more intended recipient devices. In some examples, a BlockACK mechanism associated with a GLK SYNRA group address does not use an inactivity timer (e.g., based on the BlockACK timeout value 406) because the originator of the corresponding Groupcast frames might switch between the GLK-GCR unsolicited retransmission mode 212 (FIG. 2) and the GLK-GCR BlockACK mode 210 (FIG. 2) during the life of the GLK-GCR link 202.

Figure 5:
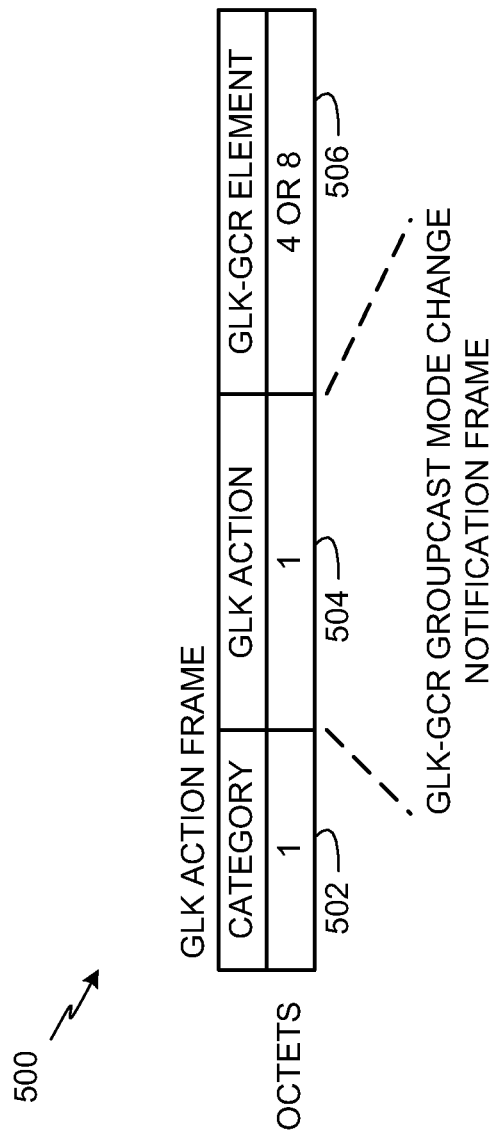
FIG. 5 is an example GLK-GCR Groupcast mode change notification frame for use by the AP of FIGS. 1 and 2 to notify the STA of FIGS. 1 and 2 that the AP is transmitting the GLK-GCR element of FIG. 4 to define a GLK-GCR retransmission policy.

FIG. 5 is an example GLK Action frame 500 for use by the AP 104 of FIGS. 1 and 2 to notify the STA 102 of FIGS. 1 and 2 that the AP 104 is transmitting the GLK-GCR element 400 of FIG. 4 to specify a GLK-GCR mode (e.g., the GLK-GCR unsolicited retransmission mode 212 (FIG. 2), the GLK-GCR BlockACK mode 210 (FIG. 2), etc.) in the GLK-GCR retransmission policy field 402. The GLK Action frame 500 is one of several Action frames defined to support GLK functionality. An example category field 502 in the first octet of the GLK Action frame 500 is used by the AP 104 to identify the Action frame 500 as a GLK Action frame. An example GLK-GCR Action field 504 in the octet immediately following the category field 502 is used by the AP 104 to store a value of 'GLK-GCR Groupcast mode change notification frame' to inform the STA 102 of a forthcoming GLK-GCR element 400 of FIG. 4.

An example GLK-GCR element field 506 in the GLK Action frame 500 is used by the AP 104 to send the GLK-GCR element 400 of FIG. 4 to the STA 102 to specify the GLK-GCR mode (e.g., the GLK-GCR unsolicited retransmission mode 212 (FIG. 2), the GLK-GCR BlockACK mode 210 (FIG. 2), etc.) that the AP 104 will use over the GLK-GCR link 202. In the illustrated example, setting the GLK-GCR Action field 504 to the 'GLK-GCR Groupcast Mode Change Notification Frame' value and sending the GLK-GCR element 400 in the GLK-GCR element field 506 causes the GLK-GCR link 202 to be re-configured for use based on the new GLK-GCR mode specified in the GLK-GCR element 400 of the GLK-GCR element field 506.

Figure 6:
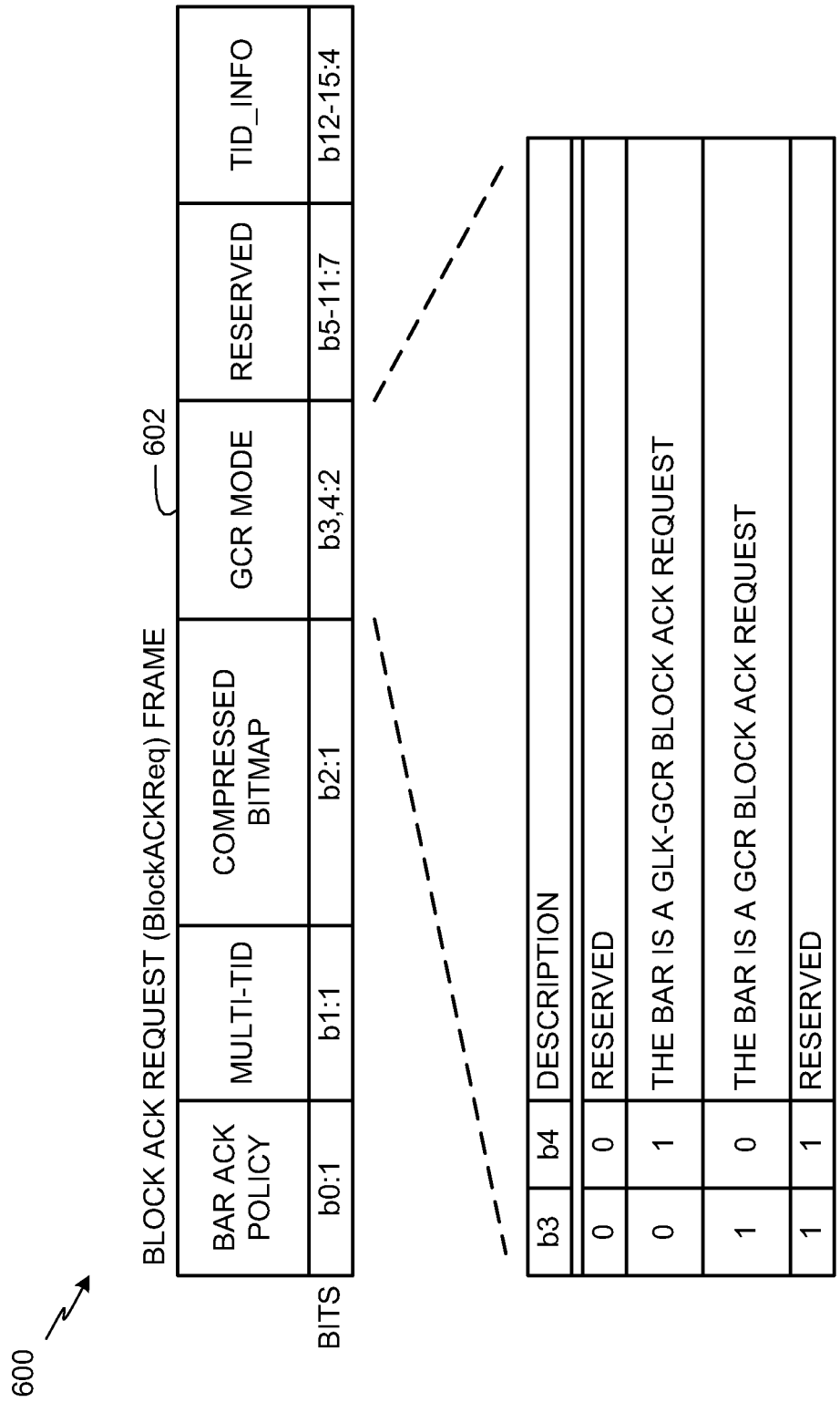
FIG. 6 is an example Block Acknowledge Request (BlockACKReq) frame for use by the AP of FIGS. 1 and 2 to inform the STA of FIGS. 1 and 2 of a GCR mode.

FIG. 6 is an example Block Acknowledge Request (BlockACKReq) frame 600 for use by an originating device (e.g., the AP 104 of FIGS. 1 and 2) to request from a destination device (e.g., the STA 102 of FIGS. 1 and 2) a BlockACK for multicast transmissions. The BlockACKReq frame 600 is also to inform the destination device (e.g., the STA 102 of FIGS. 1 and 2) of a GCR mode identified in an example GCR mode field 602. The originating device (e.g., the AP 104) uses the BlockACKReq frame 600 of the illustrated example to specify whether the originating device is using the BlockACK mode for a GLK-GCR link or a GCR link. In the illustrated example, the example originating device sets bits 3 and 4 of the BlockACKReq frame 600 to b3=0, b4=1 to inform the recipient device (e.g., the STA 102) that the originating device (e.g., the AP 104) is transmitting a GLK-GCR Block ACK Request to use a GLK-GCR type of BlockACK mode over the GLK-GCR link 202. Alternatively, to inform the intended recipient device (e.g., the STA 102) that the originating device (e.g., the AP 104) is to use a GCR type of BlockACK mode, the AP 104 sets bits 3 and 4 of the BlockACKReq frame 600 to b3=1, b4=0. The BlockACKReq frame 600 may be sent by the originating device at any time during the GLK-GCR link 202 in a quality of service (QoS) control frame to inform the intended recipient device how the GLK-GCR BlockACK mode 210 is to be used for the forthcoming one or more multicast transmissions.

Figure 7:
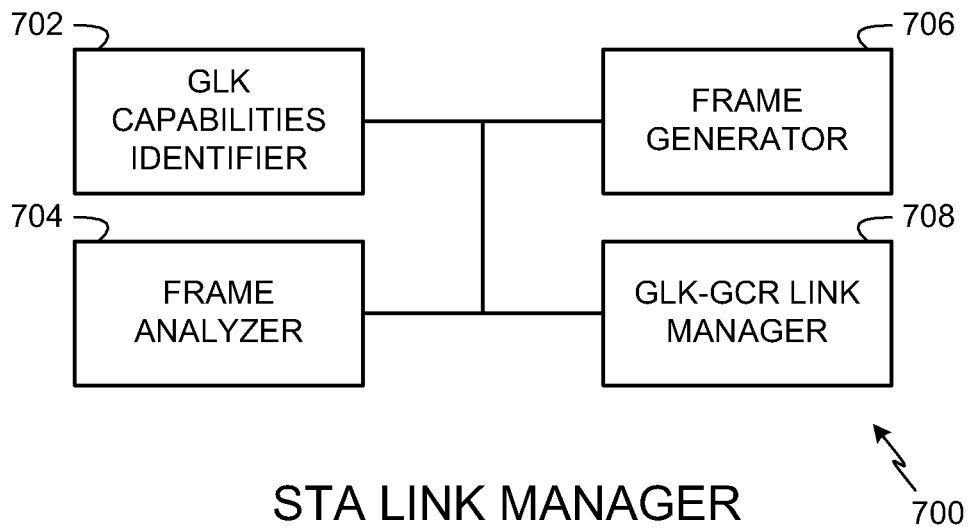
FIG. 7 is an example STA link manager apparatus that may be implemented in the STA of FIGS. 1 and 2 to establish, manage, and/or tear down GLK-GCR links.

FIG. 7 is an example STA link manager apparatus 700 that may be implemented in the STA 102 of FIGS. 1 and 2 to request GLK-GCR links (e.g., the GLK-GCR link 202 of FIG. 2) and manage communications over GLK-GCR links and teardowns of GLK-GCR links. In the illustrated example, the STA link manager 700 includes an example GLK capabilities identifier 702, an example frame analyzer 704, an example frame generator 706, and an example GLK-GCR link manager 708.

The example STA link manager 700 is provided with the example GLK capabilities identifier 702 to identify the GLK capabilities and/or preferences of the STA 102 using the GLK capabilities element 300 of FIG. 3. For example, the GLK capabilities identifier 702 may set the DNSB flag 304, the DNSU flag 306, and the DNSM flag 308 in the GLK capabilities field 302. In addition, the GLK capabilities identifier 702 may provide the GLK-GCR mode parameter 310 in the GLK capabilities field 302 of the GLK capabilities element 300 to indicate to the AP 104 that the STA 102 is capable of supporting the GLK-GCR link 202 of FIG. 2.

The example STA link manager 700 is provided with the example frame analyzer 704 to analyze received frames and is provided with the example frame generator 706 to generate frames for transmission. The example STA link manager 700 is provided with the GLK-GCR link manager 708 to manage resources and memory allocated for using the GLK-GCR link 202, to manage communications over the GLK-GCR link 202, and to manage releasing resources and memory allocations when the GLK-GCR link 202 is torn down. The example GLK-GCR link manager 708 is also configured to identify the GLK-GCR retransmission policy in the GLK-GCR retransmission policy field 402 of the GLK-GCR element 400 when the STA 102 is the originating device of multicast transmissions. The example GLK-GCR link manager 708 is also configured to select the type of BlockACK request to indicate in the GCR mode field 602 of the BlockACKReq frame 600 of FIG. 6 when the STA 102 is the originating device of multicast transmissions.

Figure 8:
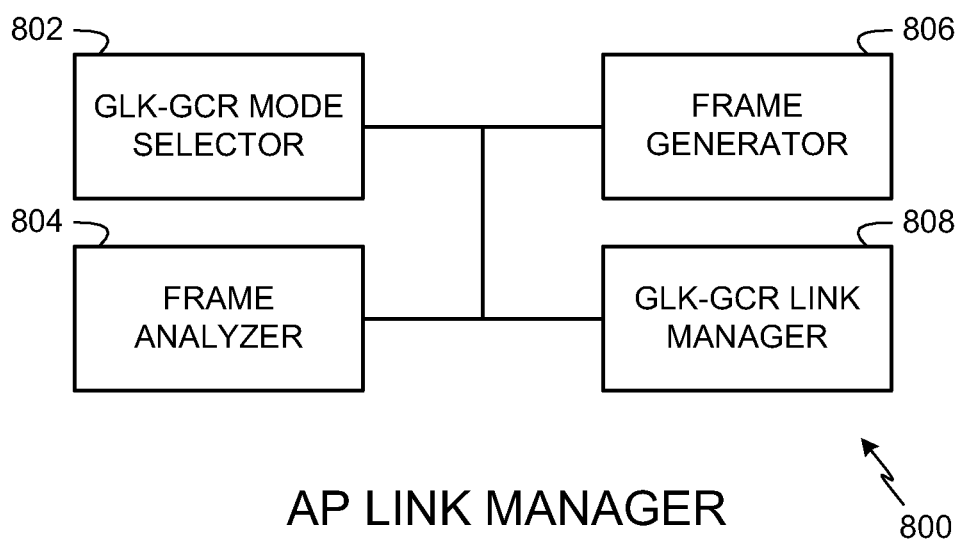
FIG. 8 is an example AP link manager apparatus that may be implemented in the AP of FIGS. 1 and 2 to establish, manage, and/or tear down GLK-GCR links.

FIG. 8 is an example AP link manager apparatus 800 that may be implemented in the AP 104 of FIGS. 1 and 2 to establish, manage, and/or tear down GLK-GCR links (e.g., the GLK-GCR link 202 of FIG. 2). In the illustrated example, the AP link manager 800 includes an example GLK-GCR mode selector 802, an example frame analyzer 804, an example frame generator 806, and an example GLK-GCR link manager 808.

The example AP link manager 800 is provided with the example GLK-GCR mode selector 802 to select the GLK-GCR mode of the AP 104 such as the GLK-GCR BlockACK mode 210 or the GLK-GCR unsolicited retransmission mode 212 of FIG. 2. For example, the GLK-GCR mode selector 802 may set bits b3, b4 in the GLK-GCR mode parameter 310 set to b3=1, b4=0 to select the GLK-GCR unsolicited retransmission mode 212, and/or may set the bits to b3=1, b4=1 to select the GLK-GCR BlockACK mode 210. The GLK-GCR mode selector 802 may also select that a GLK-GCR mode is not supported, implemented, or activated (e.g., bits b3, b4 of the GLK-GCR mode parameter 310 set to b3=0, b4=0) and/or that a GLK-GCR mode is not operational (e.g., bits b3, b4 of the GLK-GCR mode parameter 310 set to b3=0, b4=1) in the AP 104.

The example AP link manager 800 is provided with the example frame analyzer 804 to analyze received frames and is provided with the example frame generator 806 to generate frames for transmission. The example AP link manager 800 is provided with the GLK-GCR link manager 808 to manage the establishing, maintaining, and tearing down of the GLK-GCR link 202. The example GLK-GCR link manager 808 is also configured to identify the GLK-GCR retransmission policy in the GLK-GCR retransmission policy field 402 of the GLK-GCR element 400 when the AP 104 is the originating device of multicast transmissions. The example GLK-GCR link manager 808 is also configured to select the type of BlockACK request to indicate in the GCR mode field 602 of the BlockACKReq frame 600 of FIG. 6 when the AP 104 is the originating device of multicast transmissions.

While example manners of implementing the STA link manager 700 is illustrated in FIG. 7 and the AP link manager 800 is illustrated in FIG. 8, one or more of the elements, processes and/or devices illustrated in FIGS. 7 and 8 may be combined, divided, re-arranged, omitted, eliminated and/or implemented in any other way. Further, the example GLK capabilities identifier 702, the example frame analyzer 704, the example frame generator 706, the example GLK-GCR link manager 708, the example GLK-GCR mode selector 802, the example frame analyzer 804, the example frame generator 806, and the example GLK-GCR link manager 808 and/or, more generally, the example STA link manager 700 of FIG. 7 and/or the example AP link manager 800 of FIG. 8 may be implemented by hardware, software, firmware and/or any combination of hardware, software and/or firmware. Thus, for example, any of the example GLK capabilities identifier 702, the example frame analyzer 704, the example frame generator 706, the example GLK-GCR link manager 708, the example GLK-GCR mode selector 802, the example frame analyzer 804, the example frame generator 806, and the example GLK-GCR link manager 808 and/or, more generally, the example STA link manager 700 and/or the example AP link manager 800 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GLK capabilities identifier 702, the example frame analyzer 704, the example frame generator 706, the example GLK-GCR link manager 708, the example GLK-GCR mode selector 802, the example frame analyzer 804, the example frame generator 806, and the example GLK-GCR link manager 808 is/are hereby expressly defined to include a tangible computer readable storage device or storage disk such as a memory, a digital versatile disk (DVD), a compact disk (CD), a Blu-ray disk, etc. storing the software and/or firmware. Further still, the example STA link manager 700 of FIG. 7 and/or the example AP link manager 800 of FIG. 8 may include one or more elements, processes and/or devices in addition to, or instead of, those illustrated in FIG. 7 and/or FIG. 8, and/or may include more than one of any or all of the illustrated elements, processes and devices.

Figure 11:
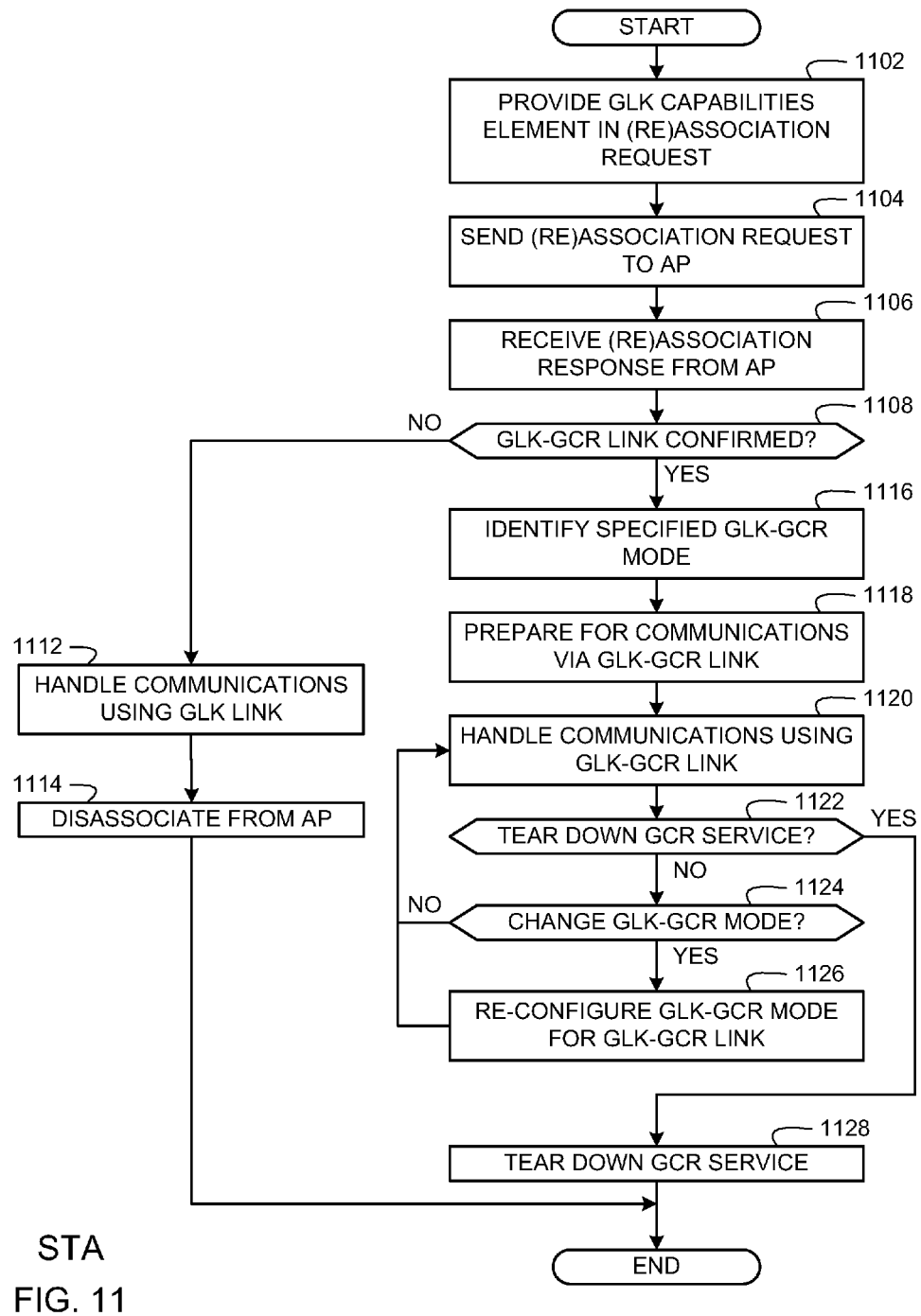
FIG. 11 is another example flow diagram representative of computer readable instructions that may be executed to implement the example STA link manager apparatus of FIG. 7 in the STA of FIGS. 1 and 2 to establish, use, and/or tear down GLK-GCR links.
Figure 12A:
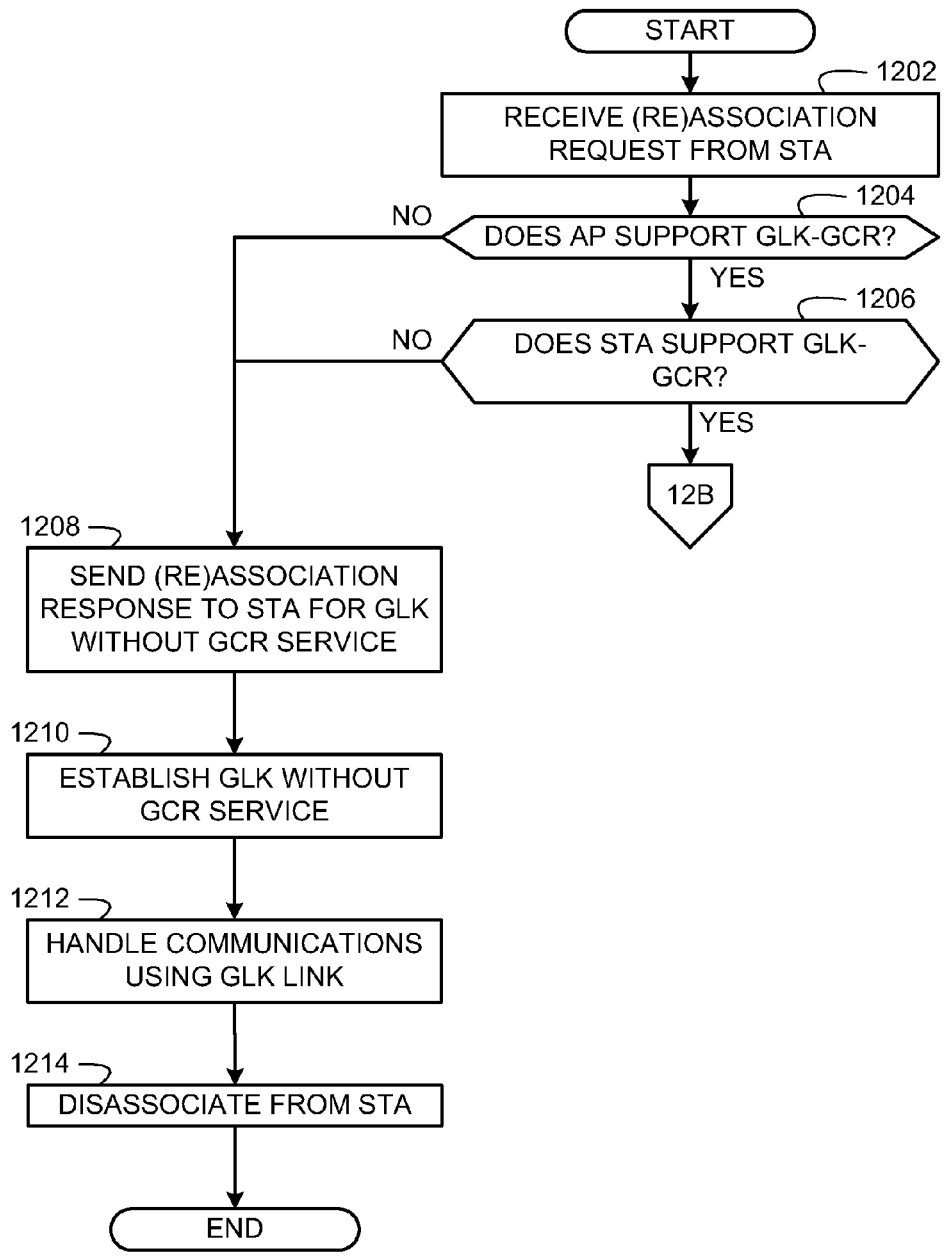
FIGS. 12A and 12B illustrate another example flow diagram representative of computer readable instructions that may be executed to implement the example AP link manager apparatus of FIG. 8 in the AP of FIGS. 1 and 2 to establish, use, and/or tear down GLK-GCR links.
Figure 12B:
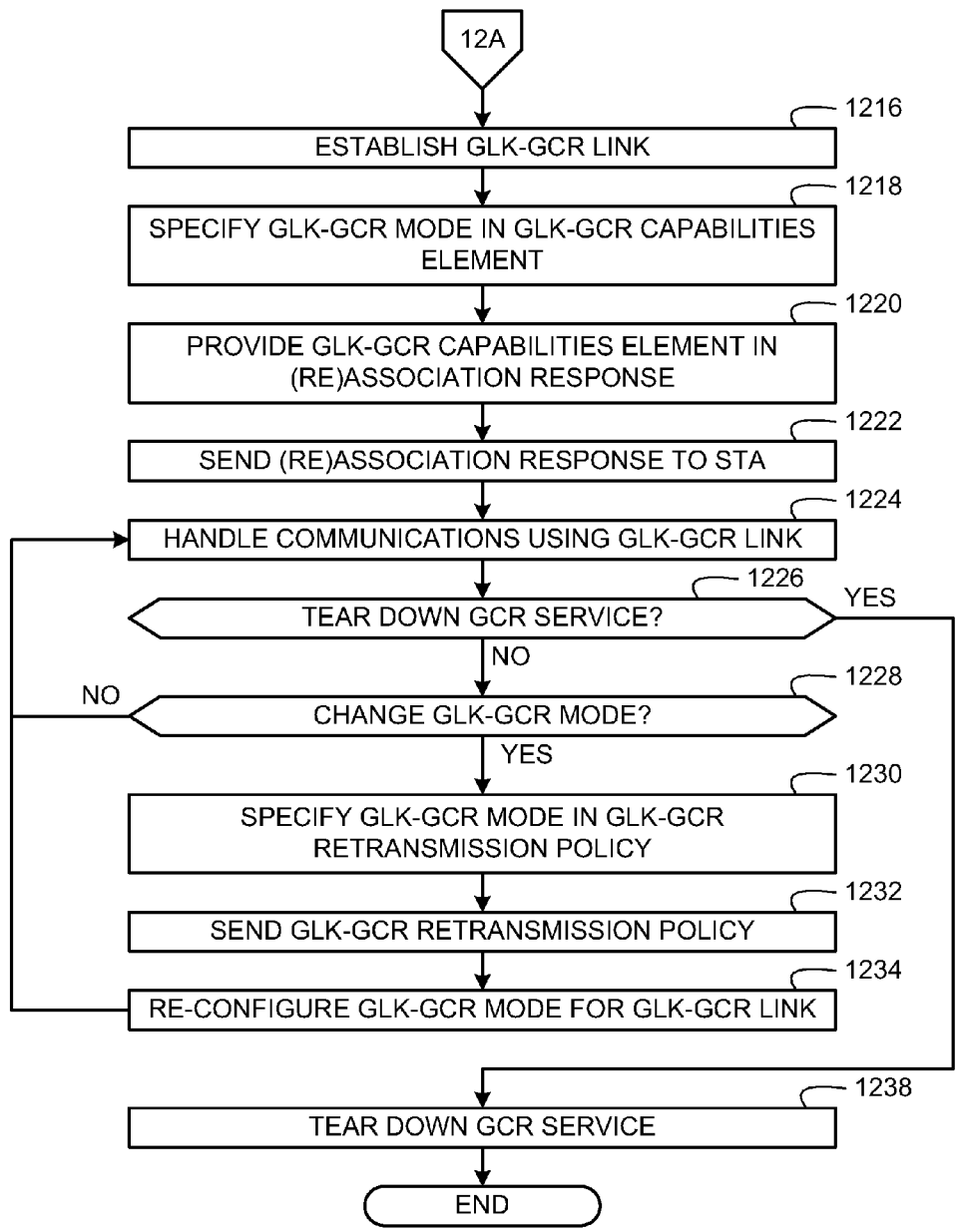

FIG. 9 is an example flow diagram representative of computer readable instructions that may be stored on a computer readable medium and executed to implement the example STA link manager 700 of FIG. 7 in the STA 102 of FIGS. 1 and 2 to establish the example GLK-GCR link 202 of FIG. 2 between the STA 102 and the AP 104 of FIGS. 1 and 2 when the STA 102 becomes associated with the AP 104. The computer readable instructions of FIG. 9 may also be executed to tear down the example GLK-GCR link 202 when the STA 102 is disassociated from the AP 104. FIG. 10 is an example flow diagram representative of computer readable instructions that may be stored on a computer readable medium and executed to implement the example AP link manager 800 in the AP 104 to establish the example GLK-GCR link 202 between the STA 102 and the AP 104 when the STA 102 becomes associated with the AP 104. The computer readable instructions of FIG. 10 may also be executed to tear down the example GLK-GCR link 202 when the STA 102 is disassociated from the AP 104. FIG. 11 is another example flow diagram representative of computer readable instructions that may be stored on a computer readable medium and executed to implement the example STA link manager 700 in the STA 102 to establish, use, and/or tear down the example GLK-GCR link 202. FIGS. 12A and 12B depict another example flow diagram representative of computer readable instructions that may be stored on a computer-readable medium and executed to implement the example AP link manager 800 in the AP 102 to establish, use, and/or tear down the example GLK-GCR link 202.

The machine readable instructions represented by the example flow diagrams of FIGS. 9-11, 12A, and 12B include programs for execution by a processor such as the processor 1312 shown in the example processor platform 1300 discussed below in connection with FIG. 13 and/or the processor 1412 shown in the example processor platform 1400 discussed below in connection with FIG. 14. The programs may be embodied in software stored on a tangible computer readable storage medium such as a CD-ROM, a floppy disk, a hard drive, a digital versatile disk (DVD), a Blu-ray disk, or a memory associated with the processor 1312 and/or the processor 1412, but the entire program and/or parts thereof could alternatively be executed by a device other than the processor 1312 and/or the processor 1412 and/or embodied in firmware or dedicated hardware. Further, although the example programs described with reference to the flow diagrams illustrated in FIGS. 9-11, 12A, and 12B, many other methods of implementing the example STA link manager 700 and the AP link manager 800 may alternatively be used. For example, the order of execution of the blocks may be changed, and/or some of the blocks described may be changed, eliminated, or combined.

As mentioned above, the example processes of FIGS. 9-11, 12A, and 12B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-11, 12A, and 12B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning now in detail to FIG. 9, the example program of FIG. 9 is used to implement the STA link manager 700 at the STA 102. The example program of FIG. 9 may be used for an association and/or reassociation of the STA 102 with the AP 104. The example program of FIG. 9 begins when the STA 102 sends the example (re)association request 204 to the AP 104 (block 902). For example, the frame generator 706 (FIG. 7) of the STA 102 generates the example (re)association request 204 for transmission to the AP 104 to inform the AP 104 of the GLK link capabilities and the GLK-GCR link capabilities of the STA 102 concurrently in the same frame.

The example STA 102 then receives the example (re)association response 206 (FIG. 2) from the AP 104 (block 904). Based on the (re)association response 206 from the AP 104, the example GLK-GCR link manager 708 (FIG. 7) of the STA 102 confirms the GLK-GCR link 202 between the STA 102 and the AP 104 (block 906). That is, the GLK link and GCR service are established concurrently when the AP 104 successfully associates the STA 102 with the AP 104 such that setup of the GLK-GCR link 202 is an implicit part of the association/reassociation procedure between the STA 102 and the AP 104 without needing a separate explicit frame exchange to establish a GCR service between the STA 102 and the AP 104.

In the illustrated example of FIG. 9, the GLK-GCR link manager 708 of the STA 102 tears down the GCR service when the STA 102 is disassociated from the AP 104 (block 908). For example, when the GLK-GCR link manager 708 detects that the STA 102 is no longer associated with the AP 104, the GLK-GCR link manager 708 releases resources and/or memory allocations of the STA 102 that were used to maintain the GLK-GCR link 202. In this manner, the GLK-GCR link manager 708 tears down the STA's end of the GLK-GCR link 202 during the GLK-GCR teardown 220 of FIG. 2 without the need for an explicit frame exchange to trigger the teardown of the GLK-GCR link 202. As such, the teardown of the GLK-GCR link 202 is implicit to the disassociation of the STA 102 from the AP 104. The example process of FIG. 9 then ends.

Turning now to FIG. 10, the example program of FIG. 10 is used to implement the AP link manager 800 (FIG. 8) at the AP 104 (FIGS. 1 and 2). The example program of FIG. 10 may be used for an association and/or reassociation of the AP 104 with the STA 102. The example program of FIG. 10 begins when the example AP 104 receives the (re)association request 204 (FIG. 2) from the STA 102 (block 1002). For example, the AP 104 receives the (re)association request 204 transmitted by the STA 102 at block 902 of FIG. 9. The example AP 104 sends the (re)association response 206 (FIG. 2) to the STA 102 (block 1004). For example, the AP 104 sends the (re)association response 206 to the STA 102 to inform the STA 102 of the GLK link capabilities and the GLK-GCR link capabilities of the AP 104 concurrently in the same frame.

The example GLK-GCR link manager 808 (FIG. 8) of the AP 104 establishes the GLK-GCR link 202 with the STA 102 (block 1006). In this manner, the GLK link and GCR service are established concurrently such that setup of the GLK-GCR link 202 is an implicit part of the association/reassociation procedure between the STA 102 and the AP 104 without needing a separate explicit frame exchange to establish a GCR service between the STA 102 and the AP 104. For example, the GLK-GCR link manager 808 establishes the GLK-GCR link 202 using the retransmission mode specified in the GLK-GCR mode parameter 310. In the illustrated example of FIG. 10, the GLK-GCR link manager 808 of the AP 104 tears down the GCR service when the STA 102 is disassociated from the AP 104 (block 1008). For example, when the GLK-GCR link manager 808 detects that the STA 102 is no longer associated with the AP 104, the GLK-GCR link manager 808 releases resources and/or memory allocations of the AP 104 that were used to maintain the GLK-GCR link 202. In this manner, the GLK-GCR link manager 808 tears down the AP's end of the GLK-GCR link 202 during the GLK-GCR teardown 220 of FIG. 2 without the need for an explicit frame exchange to trigger the teardown of the GLK-GCR link 202. As such, the teardown of the GLK-GCR link 202 is implicit to the disassociation of the STA 102 from the AP 104. The example process of FIG. 10 then ends.

Another example program to implement the STA link manager 700 (FIG. 7) at the STA 102 of FIGS. 1 and 2 is represented by the flow diagram of FIG. 11. The example program of FIG. 11 may be used for an association and/or reassociation of the STA 102 with the AP 104. The example program of FIG. 11 begins when the example GLK capabilities identifier 702 (FIG. 7) provides the GLK capabilities element 300 (FIG. 3) for the (re)association request 204 (FIG. 2) (block 1102). For example, the GLK capabilities identifier 702 provides the GLK capabilities element 300 to the frame generator 706 for placement in the (re)association request 204 with desired GLK link capabilities in the DNSB flag 304, the DNSU flag 306, and the DNSM flag 308. In the illustrated example, the GLK capabilities identifier 702 also provides the GLK-GCR mode parameter 310 for placement in the GLK capabilities element 300 to inform the AP 104 that the STA 102 is capable of using a GLK-GCR link. However, the GLK capabilities identifier 702 does not specify any settings in the GLK-GCR mode parameter 310. By including the GLK link capabilities in the DNSB flag 304, the DNSU flag 306, and the DNSM flag 308, and including the GLK-GCR mode parameter 310 in the (re)association request 204, the STA 102 can inform the AP 104 of the GLK link capabilities and the GLK-GCR link capabilities of the STA 102 concurrently in the same frame. The example STA 102 then sends the example (re)association request 204 to the AP 104 (block 1104).

The example STA 102 then receives the example (re)association response 206 (FIG. 2) from the AP 104 (block 1106). Based on the (re)association response 206 from the AP 104, the example frame analyzer 704 (FIG. 7) of the STA 102 determines whether the AP 104 has established the GLK-GCR link 202 (block 1108). For example, when the (re)association response 206 is indicative of a successful association (e.g., based on an association success flag in the (re)association response 206) of the STA 102 to the AP 104, the frame analyzer 704 of the STA 102 analyzes the received (re)association response 206 to determine if there are any GLK-GCR link capabilities specified by the AP 104 in the GLK-GCR mode parameter 310 of the GLK capabilities element 300 located in the (re)association response 206. For example, the AP 104 may specify the GLK-GCR BlockACK mode 210 (FIG. 2) (e.g., b3=1, b4=1 in the GLK-GCR mode parameter 310) or the GLK-GCR unsolicited retransmission mode 212 (FIG. 2) (e.g., b3=1, b4=0 in the GLK-GCR mode parameter 310).

If the frame analyzer 704 of the STA 102 determines that the AP 104 does not have GLK-GCR link capabilities, the STA 102 handles communications using the GLK link (block 1112). For example, the frame analyzer 704 determines that the AP 104 does not have GLK-GCR link capabilities if the GLK-GCR mode parameter 310 indicates that GLK-GCR is not supported, implemented, or activated (e.g., b3=0, b4=0 in the GLK-GCR mode parameter 310), or indicates that GLK-GCR is not operational (e.g., b3=0, b4=1 in the GLK-GCR mode parameter 310). The STA 102 then subsequently disassociates from the AP 104 (block 1114). The example process of FIG. 11 then ends.

If the frame analyzer 704 of the STA 102 determines at block 1108 a successful association using the GLK-GCR link 202 with the AP 104, the example frame analyzer 704 of the STA 102 identifies the GLK-GCR mode specified by the AP 104 (block 1116). For example, the frame analyzer 704 of the STA 102 analyzes the GLK-GCR mode parameter 310 of the GLK capabilities element 300 located in the (re)association response 206 to determine the GLK-GCR link mode that the AP 104 used to associate the STA 102 with the AP 104 for the GLK-GCR link 104. In the illustrated example, the AP 104 specifies the GLK-GCR BlockACK mode 210 (FIG. 2) (e.g., b3=1, b4=1 in the GLK-GCR mode parameter 310) or the GLK-GCR unsolicited retransmission mode 212 (FIG. 2) (e.g., b3=1, b4=0 in the GLK-GCR mode parameter 310) for the GLK-GCR link 202 established between the AP 104 and the STA 102.

The example GLK-GCR link manager 708 of the STA 102 prepares the STA 102 for communications via the GLK-GCR link 202 between the STA 102 and the AP 104 (block 1118) based on the GLK-GCR mode specified by the AP 104 in the (re)association response 206. That is, when the AP 104 associates the STA 102, the GLK link and GCR service are established concurrently by the AP 104 such that setup of the GLK-GCR link 202 is an implicit part of the association/reassociation procedure between the STA 102 and the AP 104 without needing a separate explicit frame exchange to establish a GCR service between the STA 102 and the AP 104. In the illustrated example, the GLK-GCR link manager 708 prepares the STA 102 for communications via the GLK-GCR link 202 by allocating memory and confirming resources allocated by the AP 104 to use for receiving communications from the AP 104 and sending communications to the STA 104. The example STA 102 handles communications using the GLK-GCR link 202 (block 1120). For example, the STA 102 handles receiving and processing of initial multicast transmissions and/or the unicast retransmissions 214 (FIG. 2) or the multicast retransmissions 216 (FIG. 2).

In the illustrated example, the GLK-GCR link manager 708 of the STA 102 determines whether it should tear down the GCR service (block 1122). For example, the GLK-GCR link manager 708 may determine whether to tear down the GCR service based on whether the STA 102 is disassociated from the AP 104. If the GCR service is not to be torn down, the GLK-GCR link manager 708 at the STA 102 determines whether to change a GLK-GCR mode (block 1124). For example, the STA 102 may receive and process a GLK action frame from the AP 104 that includes the GLK-GCR retransmission policy field 402 of the GLK-GCR element 400 (FIG. 4). If the GLK-GCR link manager 708 of the STA 102 determines at block 1124 that it should not change to a different GLK-GCR mode, control returns to block 1120. However, if the GLK-GCR link manager 708 of the STA 102 determines at block 1124 that it should change to a different GLK-GCR mode, the GLK-GCR link manager 708 re-configures the GLK-GCR mode for the GLK-GCR link 202 (block 1126). For example, the GLK-GCR link manager 708 re-configures the GLK-GCR mode for the GLK-GCR link 202 based on the GLK-GCR retransmission policy 402 in the GLK-GCR element 400 that causes the GLK-GCR link manager 708 to switch between the GLK-GCR BlockACK mode 210 and the GLK-GCR unsolicited retransmission mode 212 of FIG. 2. The STA 102 then handles communications using the GLK-GCR link 202 (block 1120) based on the changed GLK-GCR mode.

In the illustrated example of FIG. 11, when the GLK-GCR manager 708 of the STA 102 determines at block 1122 that it should tear down the GCR service, the GLK-GCR link manager 708 of the STA 102 tears down the GCR service (block 1128). For example, when the GLK-GCR link manager 708 detects that the STA 102 is no longer associated with the AP 104, the GLK-GCR link manager 708 releases resources and/or memory allocations of the STA 102 that were used to maintain the GLK-GCR link 202. In this manner, the GLK-GCR link manager 708 tears down the STA's end of the GLK-GCR link 202 during the GLK-GCR teardown 220 of FIG. 2 without the need for an explicit frame exchange to trigger the teardown of the GLK-GCR link 202. As such, the teardown of the GLK-GCR link 202 is implicit to the disassociation of the STA 102 from the AP 104. The example process of FIG. 11 then ends.

Another example program to implement the AP link manager 800 (FIG. 8) at the AP 104 of FIGS. 1 and 2 is represented by the flow diagram of FIGS. 12A and 12B. The example program of FIGS. 12A and 12B may be used for an association and/or reassociation of the STA 102 with the AP 104. The example program of FIGS. 12A and 12B begins when the example AP 104 receives the (re)association request 204 (FIG. 2) from the STA 102 (block 1202) (FIG. 12A). For example, the AP 104 receives the (re)association request 204 transmitted by the STA 102 at block 1104 of FIG. 11. The example GLK-GCR link manager 808 (FIG. 8) of the AP 104 determines whether the AP 104 supports a GLK-GCR service (block 1204). For example, the GLK-GCR link manager 808 may analyze a GCR capabilities data structure of the AP 104 to determine whether the AP 104 supports any GLK-GCR service. If the AP 104 supports a GLK-GCR service, the example frame analyzer 704 (FIG. 7) of the AP 104 determines whether the STA 102 supports a GLK-GCR service (block 1206). For example, the frame analyzer 704 of the AP 104 analyzes the GLK capabilities element 300 (FIG. 3) located in the received (re)association request 204 to determine whether the GLK capabilities element 300 includes the GLK-GCR mode parameter 310, which indicates that the STA 102 can support a GLK-GCR link.

If the GLK-GCR link manager 808 determines at block 1204 that the AP 104 does not support a GLK-GCR service, or if the frame analyzer 804 determines at block 1206 that the STA 102 does not support a GLK-GCR service, the AP 104 sends the (re)association response 206 (FIG. 2) to the STA 102 to establish a GLK link without GCR service (block 1208). The example GLK-GCR link manager 808 (FIG. 8) of the AP 104 establishes a GLK link without GCR service (block 1210). The AP 104 then handles communications using the GLK link (block 1212). The AP 104 then subsequently disassociates from the STA 102 (block 1214). The example process of FIGS. 12A and 12B then ends.

If the frame analyzer 804 of the AP 104 determines at block 1206 that the STA 102 does have GLK-GCR capabilities, the example GLK-GCR link manager 810 of the AP 104 establishes the GLK-GCR link 202 with the STA 102 (block 1216) (FIG. 12B) based on the GLK-GCR capabilities of the AP 104. For example, the AP 104 establishes the GLK-GCR link 202 by, for example, storing a MAC address of the STA 102 in an association table of the AP 104 to associate the STA 102 with the AP 104. In performing this association, the AP 104 establishes the GLK-GCR link 202 with the newly associated STA 102. In this manner, the GLK link and GCR service are established concurrently such that setup of the GLK-GCR link 202 is an implicit part of the association/reassociation procedure between the STA 102 and the AP 104 without needing a separate explicit frame exchange to establish a GCR service between the STA 102 and the AP 104. The example frame generator 806 (FIG. 8) of the AP 104 specifies a GLK-GCR mode in the GLK capabilities element 300 (FIG. 3) (block 1218). For example, the frame generator 806 of the AP 104 uses the GLK-GCR mode parameter 310 of the GLK capabilities element 300 located in the (re)association response 206 to specify whether the AP 104 supports the GLK-GCR BlockACK mode 210 (FIG. 2) (e.g., b3=1, b4=1 in the GLK-GCR mode parameter 310) or the GLK-GCR unsolicited retransmission mode 212 (FIG. 2) (e.g., b3=1, b4=0 in the GLK-GCR mode parameter 310) for the GLK-GCR link 202 established between the STA 102 and the AP 104. By specifying the GLK-GCR mode in the GLK-GCR mode parameter 310 in the (re)association response 206 in association with the GLK capabilities field 302, the AP 104 informs the STA 102 of the GLK-GCR mode to be used by the AP 104 as specified in the GLK-GCR mode parameter 310 while simultaneously confirming the GLK capabilities of the AP 104 by including the GLK capabilities field 302.

The example frame generator 806 of the AP 104 provides the GLK capabilities element 300 in the (re)association response 206 (FIG. 2) (block 1220). The example AP 104 sends the (re)association response 206 to the STA 102 (block 1222). The AP 102 handles communications using the GLK-GCR link 202 (block 1224). For example, the AP 104 generates and transmits initial multicast transmissions and/or the unicast transmissions 214 (FIG. 2) or the multicast transmissions 216 (FIG. 2).

In the illustrated example, the GLK-GCR link manager 808 of the AP 104 determines whether it should tear down the GCR service (block 1226). For example, the GLK-GCR link manager 808 may determine whether to tear down the GCR service based on whether the STA 102 is disassociated from the AP 104. If the GCR service is not to be torn down, the GLK-GCR link manager 808 at the AP 104 determines whether to change a GLK-GCR mode (block 1228). For example, the AP 104 may receive data corresponding to an application (e.g., video streaming, a file transfer, etc.) that is more suitably transmitted in association with a different GLK-GCR mode (e.g., the GLK-GCR BlockACK mode 210 or the GLK-GCR unsolicited retransmission mode 212 of FIG. 2) than the GLK-GCR mode currently configured for the GLK-GCR link 202. If the GLK-GCR link manager 808 of the AP 104 determines at block 1228 that it should not change to a different GLK-GCR mode, control returns to block 1224. However, if the GLK-GCR link manager 808 of the AP 104 determines at block 1228 that it should change to a different GLK-GCR mode, at block 1230 the GLK-GCR link manager 808 specifies the changed GLK-GCR mode in the GLK-GCR retransmission policy field 402 of the GLK-GCR element 400 of FIG. 4. The AP 104 then sends the GLK-GCR retransmission policy field 402 to the STA 102 (block 1232). For example, the frame generator 806 may generate the GLK Action frame 500 to include the GLK-GCR element 400 and the GLK-GCR retransmission policy field 402 specifying the GLK-GCR mode selected by the GLK-GCR link manager 808 at block 1230. The example AP 104 may then send the GLK Action frame 500 generated by the frame generator 806 to the STA 102 to inform the STA 102 of the changed GLK-GCR mode. The GLK-GCR link manager 808 of the AP 104 re-configures the GLK-GCR mode for the GLK-GCR link 202 (block 1234). For example, the GLK-GCR link manager 808 re-configures the GLK-GCR mode for the GLK-GCR link 202 based on the GLK-GCR mode specified in the GLK-GCR retransmission policy 402. The AP 104 then handles communications using the GLK-GCR link 202 (block 1224) based on the changed GLK-GCR mode.

In the illustrated example of FIG. 12B, when the GLK-GCR manager 808 of the AP 104 determines at block 1226 that it should tear down the GCR service, the GLK-GCR link manager 808 tears down the GCR service (block 1238). That is, when the example GLK-GCR link manager 808 detects that the STA 102 is no longer associated with the AP 104, the GLK-GCR link manager 808 releases resources and/or memory allocations of the AP 104 that were used to maintain the GLK-GCR link 202. In this manner, the GLK-GCR link manager 808 tears down the AP's end of the GLK-GCR link 202 during the GLK-GCR teardown 220 of FIG. 2 without the need for an explicit frame exchange to trigger the teardown of the GLK-GCR link 202. As such, the teardown of the GLK-GCR link 202 is implicit to the disassociation of the STA 102 from the AP 104. The example process of FIGS. 12A and 12B then ends.

Figure 13:
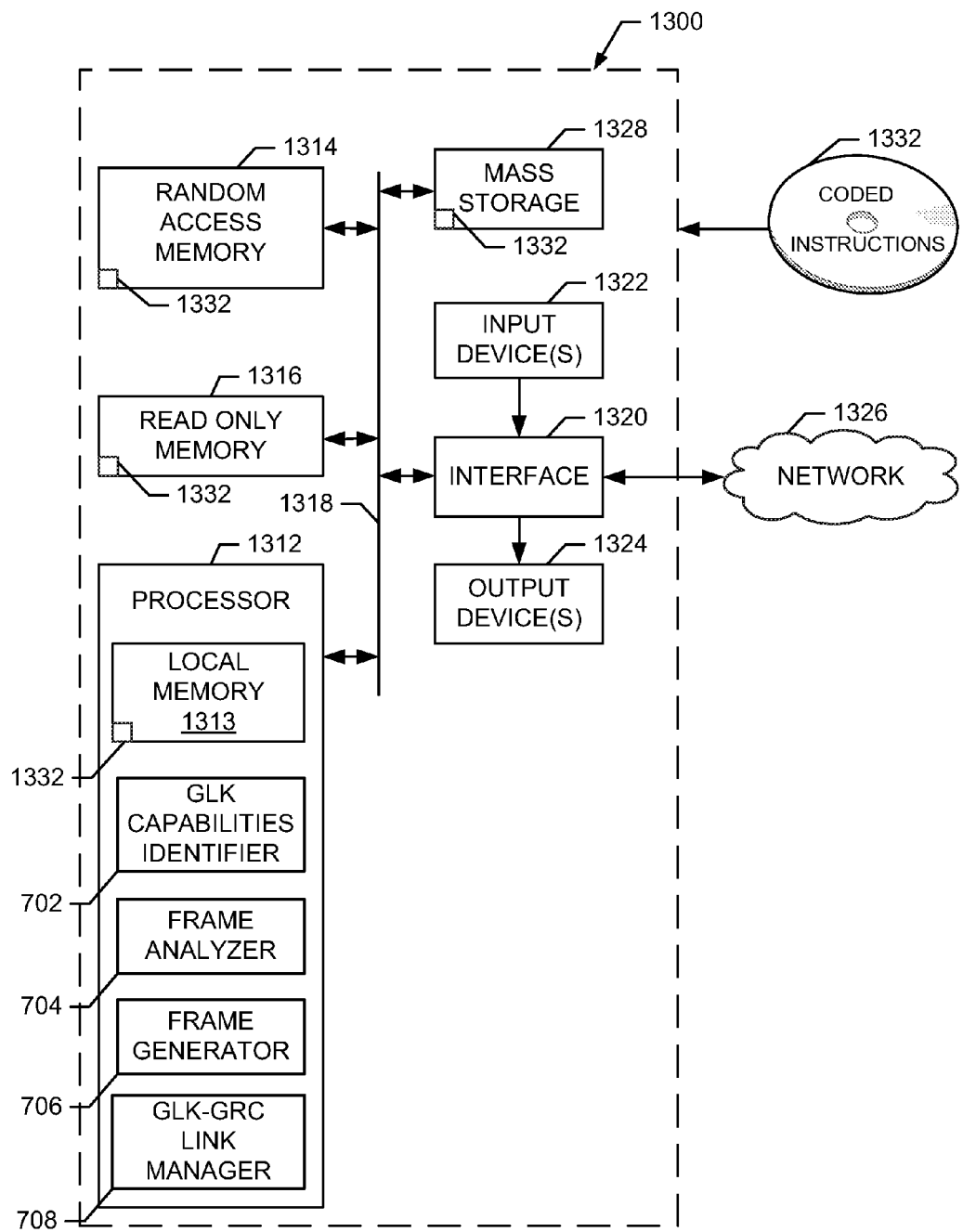
FIG. 13 is an example processor platform capable of executing the computer readable instructions represented by the example flow diagrams of FIGS. 9 and 11 to implement the example STA link manager apparatus of FIG. 7 in the STA of FIGS. 1 and 2 to establish, use, and/or tear down GLK-GCR links.

FIG. 13 is an example processor platform 1300 capable of executing the computer readable instructions represented by the example flow diagrams of FIGS. 9 and 11 to implement the example STA link manager apparatus 700 of FIG. 7 in the STA 102 of FIGS. 1 and 2 to establish, use, and/or tear down GLK-GCR links (e.g., the GLK-GCR link 202 of FIG. 2). The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The processor 1312 of the illustrated example includes the example GLK capabilities selector 702, the example frame analyzer 704, the example frame generator 706, and the example GLK-GCR link manager 708 of FIG. 7.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. In the illustrated example, the interface circuit 1320 is implemented by a wireless interface in circuit with one or more antennas. For example, the interface circuit 1320 of the illustrated example performs wireless communication operations (e.g., modulation, demodulation, amplification, etc.) to transmit and/or receive information wirelessly. In the illustrated example, the interface circuit 1320 is implemented based on the IEEE 802.11 wireless protocol. Additionally or alternatively, the interface circuit 1320 may be implemented using one or more other example wireless protocols such as a Bluetooth wireless protocol, a GSM wireless protocol, a GPRS wireless protocol, a CDMA wireless protocol, a TDMA wireless protocol, an LTE wireless protocol, etc. Additionally or alternatively, the interface circuit 1320 may be implemented by any other type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an wired or wireless Ethernet connection, a digital subscriber line (DSL), a telephone line, coaxial cable, a cellular telephone system, a Bluetooth wireless connection, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 represented by the flow diagrams of FIGS. 9 and 11 may be stored in the mass storage device 1328, in the volatile memory 1314, in the non-volatile memory 1316, and/or on a removable tangible computer readable storage medium such as a CD or DVD.

Figure 14:
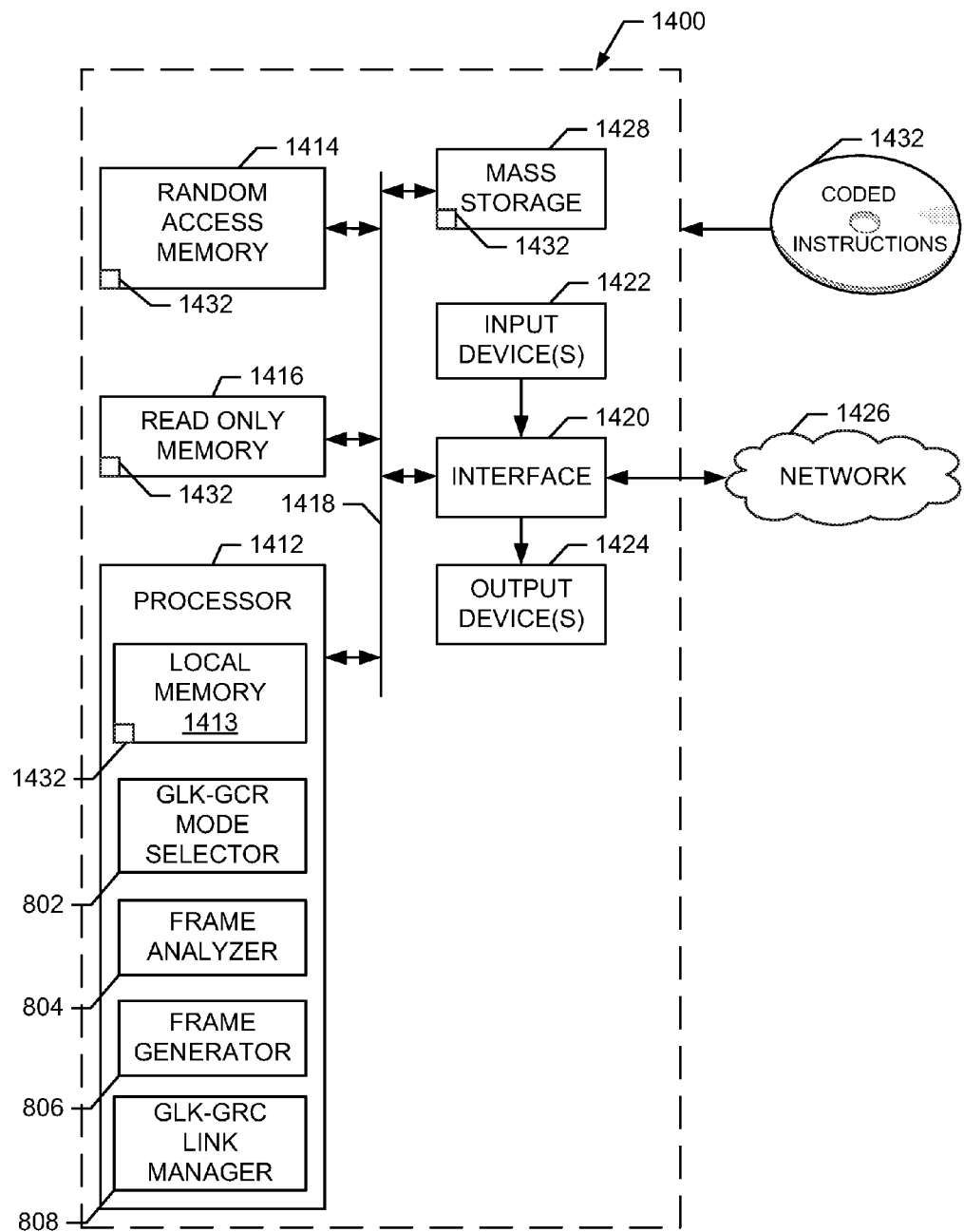
FIG. 14 is an example processor platform capable of executing the computer readable instructions represented by the example flow diagrams of FIGS. 10, 12A, and 12B to implement the example AP link manager apparatus of FIG. 8 in the AP of FIGS. 1 and 2 to establish, use, and/or tear down GLK-GCR links.

FIG. 14 is an example processor platform 1400 capable of executing the computer readable instructions represented by the example flow diagrams of FIGS. 10, 12A, and 12B to implement the example AP link manager apparatus 800 of FIG. 8 in the AP 104 of FIGS. 1 and 2 to establish, use, and/or tear down GLK-GCR links (e.g., the GLK-GCR link 202 of FIG. 2). The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The processor 1412 of the illustrated example includes the example GLK-GCR mode selector 802, the example frame analyzer 804, the example frame generator 806, and the example GLK-GCR link manager 808 of FIG. 8.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. In the illustrated example, the interface circuit 1420 is implemented by a wireless interface in circuit with one or more antennas. For example, the interface circuit 1420 of the illustrated example performs wireless communication operations (e.g., modulation, demodulation, amplification, etc.) to transmit and/or receive information wirelessly. In the illustrated example, the interface circuit 1420 is implemented based on the IEEE 802.11 wireless protocol. Additionally or alternatively, the interface circuit 1420 may be implemented using one or more other example wireless protocols such as a Bluetooth wireless protocol, a GSM wireless protocol, a GPRS wireless protocol, a CDMA wireless protocol, a TDMA wireless protocol, an LTE wireless protocol, etc. Additionally or alternatively, the interface circuit 1420 may be implemented by any other type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an wired or wireless Ethernet connection, a digital subscriber line (DSL), a telephone line, coaxial cable, a cellular telephone system, a Bluetooth wireless connection, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

Coded instructions 1432 represented by the flow diagrams of FIGS. 10 and 12 may be stored in the mass storage device 1428, in the volatile memory 1414, in the non-volatile memory 1416, and/or on a removable tangible computer readable storage medium such as a CD or DVD.

Examples disclosed herein are useful to establish a GCR service in a manner that is implicit during an association/reassociation frame exchange that is used to establish a GLK link between an STA and an AP. For example, the GCR service may be established based on GLK capabilities of the STA and the AP identified in the association/reassociation frame exchange. That is, using examples disclosed herein makes GCR service setup part of the association/reassociation process between the STA and the AP so that a GLK-GCR link is established during (e.g., concurrently with) association/reassociation of the STA with the AP. In this manner, it is not necessary to use a GCR service setup frame exchange separate from the association/reassociation frame exchange to establish a GCR service after a GLK link is already established between a STA and AP. As such, examples disclosed herein are useful to reduce wireless transmissions between STAs and APs when establishing GLK-GCR links.

Reducing wireless transmissions is useful to conserve battery power in battery-operated wireless devices. Power conservation is typically a significant design goal of engineers when designing wireless devices, software for wireless devices, and/or firmware for wireless devices. For example, every time a wireless transmission is made by a wireless device, a radio transmitter of the wireless device consumes a substantial amount of power to ensure that a sufficiently powerful radio frequency (RF) signal is emitted so that the wireless transmission is strong enough to be detected by a receiving device such as the AP. As such, each emitted wireless transmission consumes battery power, which over time reduces the useful battery life of a wireless device. Thus, reducing wireless transmissions increases useful battery life of wireless devices. Reducing wireless transmissions using examples disclosed herein also conserves battery power of wireless devices by reducing the amount of processing that needs to be performed by the wireless devices. For example, when information is wirelessly communicated by a wireless device, the wireless device uses processing resources to generate frames, messages, and/or any other information delivery units used to send wireless transmissions. Such processing resources consume battery power, which over time reduces the useful battery life of a wireless device. As such, using examples disclosed herein enables reducing battery power consumption in battery-operated wireless devices at least by reducing wireless transmissions and reducing the use of processing resources, which in turn enables increasing battery life of wireless devices so that such wireless devices can operate longer between battery charges and/or battery replacements.

Reducing wireless transmissions using examples disclosed herein to establish GLK-GCR links is also useful to reduce use of RF bandwidth and network resources. For example, when a wireless device emits a wireless transmission, RF bandwidth is used to transmit the wireless transmission and a receiving device uses processing resources to process the wireless transmission. Decreasing wireless transmissions allows RF bandwidth to remain available for other uses such as for transmissions by other wireless devices. In addition, network resources of network devices such as APs can be more readily available for other uses such as processing transmissions by other wireless devices. Accordingly, examples disclosed herein enable more efficient use of RF bandwidth and network resources which can in turn decrease network congestion and facilitate servicing more wireless clients at network access points.

The following pertain to further examples disclosed herein.

Example 1 is a method to setup a Groupcast with Retries service for use with wireless communications. The method of Example 1 includes receiving an association response at a wireless station from an access point, the association response being responsive to a General Link capability of the wireless station sent in an association request from the wireless station to the access point. The method of Example 1 also includes confirming a General Link and the Groupcast with Retries service between the wireless station and the access point based on the association response indicating that the access point has successfully associated the wireless station with the access point.

In Example 2, the subject matter of Example 1 can optionally include tearing down the Groupcast with Retries service, the tearing down being implicit to disassociation of the wireless station from the access point.

In Example 3, the subject matter of any one of Examples 1-2 can optionally include preparing the wireless station for communicating via the General Link and the Groupcast with Retries service between the wireless station and the access point based on a General Link capabilities element in the association response indicating a mode of the General Link and the Groupcast with Retries service indicated.

In Example 4, the subject matter of any one of Examples 1-3 can optionally include that the Groupcast with Retries service is to enable retransmissions of data from the access point to the wireless station.

In Example 5, the subject matter of any one of Examples 1-4 can optionally include obtaining from the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 6, the subject matter of any one of Examples 1-5 can optionally include that the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

In Example 7, the subject matter of any one of Examples 1-6 can optionally include that the association request is a reassociation request.

In Example 8, the subject matter of any one of Examples 1-7 can optionally include that the Groupcast with Retries service is confirmed after the association request and the association response associated with establishing the General Link without using a separate request and response frame exchange to establish the Groupcast with Retries service.

In Example 9, the subject matter of any one of Examples 1-8 can optionally include that the General Link and the Groupcast with Retries service are concurrently established between the wireless station and the access point over a bridged link across a wireless network and a wired network.

Example 10 is a wireless station to setup a Groupcast with Retries service for use with wireless communications. The wireless station of Example 1 includes a processor, and a memory including instructions that, when executed, cause the processor to receive an association response at the wireless station from an access point, the association response being responsive to a General Link capability of the wireless station sent in an association request from the wireless station to the access point. The instructions of Example 10 also cause the processor of the wireless station to confirm a General Link and the Groupcast with Retries service between the wireless station and the access point based on the association response indicating that the access point has successfully associated the wireless station with the access point.

In Example 11, the subject matter of Example 10 can optionally include instructions to further cause the processor to tear down the Groupcast with Retries service in a manner implicit to the wireless station being disassociated from the access point.

In Example 12, the subject matter of any one of Examples 10-11 can optionally include instructions to further cause the processor to prepare the wireless station for communicating via the General Link and the Groupcast with Retries service between the wireless station and the access point based on a General Link capabilities element in the association response indicating a mode of the General Link and the Groupcast with Retries service indicated.

In Example 13, the subject matter of any one of Examples 10-12 can optionally include that the Groupcast with Retries service is to enable retransmissions of data from the access point to the wireless station.

In Example 14, the subject matter of any one of Examples 10-13 can optionally include instructions to further cause the processor to obtain from the association response a mode for the retransmissions of the data based on the Groupcast with Retries service, the mode to be one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 15, the subject matter of any one of Examples 10-14 can optionally include that the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

In Example 16, the subject matter of any one of Examples 10-15 can optionally include that the association request is a reassociation request.

In Example 17, the subject matter of any one of Examples 10-16 can optionally include that the Groupcast with Retries service is confirmed after the association request and the association response associated with establishing the General Link without using a separate request and response frame exchange to establish the Groupcast with Retries service.

In Example 18, the subject matter of any one of Examples 10-17 can optionally include that the General Link and the Groupcast with Retries service are concurrently established between the wireless station and the access point over a bridged link across a wireless network and a wired network.

Example 19 is an article of manufacture comprising instructions that, when executed, cause a processor to at least receive an association response at a wireless station from an access point, the association response being responsive to a General Link capability of the wireless station sent in an association request from the wireless station to the access point. The instructions of Example 19 also cause the processor to at least confirm a General Link and the Groupcast with Retries service between the wireless station and the access point based on the association response indicating that the access point has successfully associated the wireless station with the access point.

In Example 20, the subject matter of Example 19 can optionally include instructions to further cause the processor to tear down the Groupcast with Retries service in a manner implicit to the wireless station being disassociated from the access point.

In Example 21, the subject matter of any one of Examples 19-20 can optionally include instructions to further cause the processor to prepare the wireless station for communicating via the General Link and the Groupcast with Retries service between the wireless station and the access point based on a General Link capabilities element in the association response indicating a mode of the General Link and the Groupcast with Retries service.

In Example 22, the subject matter of any one of Examples 19-21 can optionally include that the Groupcast with Retries service is to enable retransmissions of data from the access point to the wireless station.

In Example 23, the subject matter of any one of Examples 19-22 can optionally include instructions to further cause the processor to obtain from the association response a mode for the retransmissions of the data based on the Groupcast with Retries service, the mode to be one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 24, the subject matter of any one of Examples 19-23 can optionally include that the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

In Example 25, the subject matter of any one of Examples 19-24 can optionally include that the association request is a reassociation request.

In Example 26, the subject matter of any one of Examples 19-25 can optionally include that the Groupcast with Retries service is confirmed after the association request and the association response associated with establishing the General Link without using a separate request and response frame exchange to establish the Groupcast with Retries service.

In Example 27, the subject matter of any one of Examples 19-26 can optionally include that the General Link and the Groupcast with Retries service are concurrently established between the wireless station and the access point over a bridged link across a wireless network and a wired network.

Example 28 is a method to setup a Groupcast with Retries service for use with wireless communications. The method of Example 28 includes sending an association response from an access point to a wireless station, the association response being responsive to a General Link capability of the wireless station received in an association request at the access point from the wireless station. The method of Example 28 also includes operating the access point to concurrently establish a General Link and the Groupcast with Retries service between the access point and the wireless station based on the association request indicating that the wireless station supports the Groupcast with Retries service.

In Example 29, the subject matter of Example 28 can optionally include tearing down the Groupcast with Retries service, the tearing down being implicit to disassociation of the wireless station from the access point.

In Example 30, the subject matter of any one of Examples 28-30 can optionally include that concurrently establishing the General Link and the Groupcast with Retries service between the access point and the wireless station is based on the association request indicating the support for the Groupcast with Retries service in association with General Link capabilities in a General Link capabilities element.

In Example 31, the subject matter of any one of Examples 28-30 can optionally include that the Groupcast with Retries service is to enable retransmissions of data from the access point to the wireless station.

In Example 32, the subject matter of any one of Examples 28-31 can optionally include specifying in the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 33, the subject matter of any one of Examples 28-32 can optionally include that the association request indicates that the wireless station supports the Groupcast with Retries service by including a General Link-Groupcast with Retries service parameter indicating that the wireless station supports the General Link and the Groupcast with Retries service.

In Example 34, the subject matter of any one of Examples 28-33 can optionally include that the association request is a reassociation request.

In Example 35, the subject matter of any one of Examples 28-34 can optionally include that the Groupcast with Retries service is established based on the association request and the association response associated with establishing the General Link without using a separate request and response frame exchange to establish the Groupcast with Retries service.

In Example 36, the subject matter of any one of Examples 28-35 can optionally include that the General Link and the Groupcast with Retries service are concurrently established between the access point and the wireless station over a bridged link across a wireless network and a wired network.

Example 37 is an access point to setup a Groupcast with Retries service for use with wireless communications. The access point of Example 37 includes a processor; and a memory including instructions that, when executed, cause the processor to send an association response from the access point to a wireless station, the association response being responsive to a General Link capability of the wireless station received in an association request at the access point from the wireless station. The instructions of Example 37 also cause the processor of the access point to concurrently establish a General Link and the Groupcast with Retries service between the access point and the wireless station based on the association request indicating that the wireless station supports the Groupcast with Retries service.

In Example 38, the subject matter of Example 37 can optionally include instructions to further cause the processor to tear down the Groupcast with Retries service in a manner implicit to the wireless station being disassociated from the access point.

In Example 39, the subject matter of any one of Examples 37-38 can optionally include instructions to cause the processor to concurrently establish the General Link and the Groupcast with Retries service between the access point and the wireless station based on the association request indicating the support for the Groupcast with Retries service in association with General Link capabilities in a General Link capabilities element.

In Example 40, the subject matter of any one of Examples 37-39 can optionally include that the Groupcast with Retries service is to enable retransmissions of data from the access point to the wireless station.

In Example 41, the subject matter of any one of Examples 37-40 can optionally include instructions to further cause the processor to specify in the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 42, the subject matter of any one of Examples 37-41 can optionally include instructions to cause the processor to determine that the wireless station supports the Groupcast with Retries service based on the association request including a General Link-Groupcast with Retries service parameter indicating that the wireless station supports the General Link and the Groupcast with Retries service.

In Example 43, the subject matter of any one of Examples 37-42 can optionally include that the association request is a reassociation request.

In Example 44, the subject matter of any one of Examples 37-43 can optionally include instructions to cause the processor to establish the Groupcast with Retries service based on the association request and the association response associated with establishing the General Link without using a separate request and response frame exchange to establish the Groupcast with Retries service.

In Example 45, the subject matter of any one of Examples 37-44 can optionally include that the General Link and the Groupcast with Retries service are concurrently established between the access point and the wireless station over a bridged link across a wireless network and a wired network.

Example 46 is an article of manufacture comprising instructions that, when executed, cause a processor to at least send an association response from an access point to a wireless station, the association response being responsive to a General Link capability of the wireless station received in an association request at the access point from the wireless station. The instructions of Example 46 also cause the processor to at least concurrently establish a General Link and a Groupcast with Retries service between the access point and the wireless station based on the association request indicating that the wireless station supports the Groupcast with Retries service.

In Example 47, the subject matter of Example 46 can optionally include instructions to further cause the processor to tear down the Groupcast with Retries service in a manner implicit to the wireless station being disassociated from the access point.

In Example 48, the subject matter of any one of Examples 46-47 can optionally include instructions to cause the processor to concurrently establish the General Link and the Groupcast with Retries service between the access point and the wireless station based on the association request indicating the support for the Groupcast with Retries service in association with General Link capabilities in a General Link capabilities element.

In Example 49, the subject matter of any one of Examples 46-48 can optionally include that the Groupcast with Retries service is to enable retransmissions of data from the access point to the wireless station.

In Example 50, the subject matter of any one of Examples 46-49 can optionally include instructions to further cause the processor to specify in the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 51, the subject matter of any one of Examples 46-50 can optionally include instructions to cause the processor to determine that the wireless station supports the Groupcast with Retries service based on the association request including a General Link-Groupcast with Retries service parameter indicating that the wireless station supports the General Link and the Groupcast with Retries service.

In Example 52, the subject matter of any one of Examples 46-51 can optionally include that the association request is a reassociation request.

In Example 53, the subject matter of any one of Examples 46-52 can optionally include instructions to cause the processor to establish the Groupcast with Retries service based on the association request and the association response associated with establishing the General Link without using a separate request and response frame exchange to establish the Groupcast with Retries service.

In Example 54, the subject matter of any one of Examples 46-53 can optionally include that the General Link and the Groupcast with Retries service are concurrently established between the access point and the wireless station over a bridged link across a wireless network and a wired network.

Example 55 is a wireless station to setup a Groupcast with Retries service for use with wireless communications. The wireless station of Example 55 includes means for sending an association request from the wireless station to an access point, the association request including a General Link capability of the wireless station. The wireless station of Example 55 also includes means for receiving an association response at the wireless station from the access point, the association response being responsive to the General Link capability, and the association response to facilitate establishing a General Link concurrently with establishing the Groupcast with Retries service between the wireless station and the access point based on the association response indicating that the access point supports the Groupcast with Retries service.

In Example 56, the subject matter of Example 55 can optionally include means for tearing down the Groupcast with Retries service in a manner implicit to the wireless station being disassociated from the access point.

In Example 57, the subject matter of Example 55-56 can optionally include that the General Link is to be concurrently established with the establishing of the Groupcast with Retries service between the wireless station and the access point based on the association response including a General Link capabilities element that indicates that the access point supports the Groupcast with Retries service in association with the General Link.

In Example 58, the subject matter of Example 55-57 can optionally include that the Groupcast with Retries service is to enable retransmissions of data from the access point to the wireless station.

In Example 59, the subject matter of Example 55-58 can optionally include means for obtaining from the association response a mode for the retransmissions of the data based on the Groupcast with Retries service, the mode to be one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 60, the subject matter of Example 55-59 can optionally include that the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

In Example 61, the subject matter of Example 55-60 can optionally include that the association request is a reassociation request.

In Example 62, the subject matter of Example 55-61 can optionally include means for facilitating establishing the General Link concurrently with establishing the Groupcast with Retries service based on the association request and the association response associated with establishing the General Link without using a separate request and response frame exchange to establish the Groupcast with Retries service.

In Example 63, the subject matter of Example 55-62 can optionally include that the General Link is to be established concurrently with the establishing of the Groupcast with Retries service between the wireless station and the access point over a bridged link across a wireless network and a wired network.

Example 64 is an access point to setup a Groupcast with Retries service for use with wireless communications. The access point of Example 64 includes means for receiving an association request at the access point from a wireless station, the association request including a General Link capability of the wireless station. The access point of Example 64 also includes means for sending an association response from the access point to the wireless station, the association response being responsive to the General Link capability, and the association response to facilitate establishing a General Link concurrently with establishing the Groupcast with Retries service between the access point and the wireless station based on the association request indicating that the wireless station supports the Groupcast with Retries service.

In Example 65, the subject matter of Example 64 can optionally include means for tearing down the Groupcast with Retries service in a manner implicit to the wireless station being disassociated from the access point.

In Example 66, the subject matter of any one of Examples 64-65 can optionally include that the General Link is to be concurrently established with the establishing of the Groupcast with Retries service based on the association request including a General Link capabilities element that indicates that the wireless station supports the Groupcast with Retries service in association with the General Link.

In Example 67, the subject matter of any one of Examples 64-66 can optionally include that the Groupcast with Retries service is to enable retransmissions of data from the access point to the wireless station.

In Example 68, the subject matter of any one of Examples 64-67 can optionally include means for specifying in the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

In Example 69, the subject matter of any one of Examples 64-68 can optionally include means for determining that the wireless station supports the Groupcast with Retries service based on the association request including a General Link-Groupcast with Retries service parameter indicating that the wireless station supports the General Link and the Groupcast with Retries service.

In Example 70, the subject matter of any one of Examples 64-69 can optionally include that the association request is a reassociation request.

In Example 71, the subject matter of any one of Examples 64-70 can optionally include means for facilitating establishing the General Link concurrently with the establishing of the Groupcast with Retries service is to establish the Groupcast with Retries service based on the association request and the association response associated with establishing the General Link without using a separate request and response frame exchange to establish the Groupcast with Retries service.

In Example 72, the subject matter of any one of Examples 64-71 can optionally include that the General Link is to be established concurrently with the establishing of the Groupcast with Retries service between the access point and the wireless station over a bridged link across a wireless network and a wired network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to setup a Groupcast with Retries service for use with wireless communications, comprising:
   receiving an association response at a wireless station from an access point, the association response being responsive to a General Link capability of the wireless station sent in an association request from the wireless station to the access point; and
   confirming a General Link and the Groupcast with Retries service between the wireless station and the access point based on the association response indicating that the access point has successfully associated the wireless station with the access point.

2. A method of claim 1, further including tearing down the Groupcast with Retries service, the tearing down being implicit to disassociation of the wireless station from the access point.

3. A method of claim 1, further comprising preparing the wireless station for communicating via the General Link and the Groupcast with Retries service between the wireless station and the access point based on a General Link capabilities element in the association response indicating a mode of the General Link and the Groupcast with Retries service.

4. A method of claim 1, wherein the Groupcast with Retries service is to enable retransmissions of data from the access point to the wireless station.

5. A method of claim 4, further including obtaining from the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

6. A method of claim 1, wherein the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

7. A method of claim 1, wherein the association request is a reassociation request.

8. A method of claim 1, wherein the Groupcast with Retries service is confirmed after the association request and the association response associated with establishing the General Link without using a separate request and response frame exchange to establish the Groupcast with Retries service.

9. A method of claim 1, wherein the General Link and the Groupcast with Retries service are concurrently established between the wireless station and the access point over a bridged link across a wireless network and a wired network.

10. A wireless station to setup a Groupcast with Retries service for use with wireless communications, comprising:
a processor; and
a memory including instructions that, when executed, cause the processor to:
receive an association response at the wireless station from an access point, the association response being responsive to a General Link capability of the wireless station sent in an association request from the wireless station to the access point; and
confirm a General Link and the Groupcast with Retries service between the wireless station and the access point based on the association response indicating that the access point has successfully associated the wireless station with the access point.

11. A wireless station of claim 10, wherein the instructions further cause the processor to tear down the Groupcast with Retries service in a manner implicit to the wireless station being disassociated from the access point.

12. A wireless station of claim 10, wherein the instructions further cause the processor to prepare the wireless station for communicating via the General Link and the Groupcast with Retries service between the wireless station and the access point based on a General Link capabilities element in the association response indicating a mode of the General Link and the Groupcast with Retries service.

13. A wireless station of claim 10, wherein the Groupcast with Retries service is to enable retransmissions of data from the access point to the wireless station.

14. A wireless station of claim 13, wherein the instructions further cause the processor to obtain from the association response a mode for the retransmissions of the data based on the Groupcast with Retries service, the mode to be one of (i) an unsolicited retransmission mode in which the access point retransmits the data to the wireless station using unicast transmissions, or (ii) a Block Acknowledgment mode in which the access point retransmits the data to the wireless station using multicast transmissions.

15. A wireless station of claim 10, wherein the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

16. A wireless station of claim 10, wherein the association request is a reassociation request.

17. A wireless station of claim 10, wherein the Groupcast with Retries service is confirmed after the association request and the association response associated with establishing the General Link without using a separate request and response frame exchange to establish the Groupcast with Retries service.

18. A wireless station of claim 10, wherein the General Link and the Groupcast with Retries service are concurrently established between the wireless station and the access point over a bridged link across a wireless network and a wired network.

19. An article of manufacture comprising instructions that, when executed, cause a processor to at least:
receive an association response at a wireless station from an access point, the association response being responsive to a General Link capability of the wireless station sent in an association request from the wireless station to the access point; and
confirm a General Link and a Groupcast with Retries service between the wireless station and the access point based on the association response indicating that the access point has successfully associated the wireless station with the access point.

20. An article of manufacture of claim 19, wherein the instructions further cause the processor to tear down the Groupcast with Retries service in a manner implicit to the wireless station being disassociated from the access point.

21. An article of manufacture of claim 19, wherein the instructions further cause the processor to prepare the wireless station for communicating via the General Link and the Groupcast with Retries service between the wireless station and the access point based on a General Link capabilities element in the association response indicating a mode of the General Link and the Groupcast with Retries service.

22. An article of manufacture of claim 19, wherein the Groupcast with Retries service is to enable retransmissions of data from the access point to the wireless station.

23. An article of manufacture of claim 22, wherein the instructions further cause the processor to obtain from the association response a mode for the retransmissions of the data based on the Groupcast with Retries service, the mode to be one of (i) an unsolicited retransmission mode in which the access point retransmits the data to the wireless station using unicast transmissions, or (ii) a Block Acknowledgment mode in which the access point retransmits the data to the wireless station using multicast transmissions.

24. An article of manufacture of claim 19, wherein the association response includes a bit field to indicate that the access point supports the Groupcast with Retries service, the bit field to specify at least one of: (i) the Groupcast with Retries service is not available with the General Link, (ii) the Groupcast with Retries service is not operational with the General Link, (iii) the Groupcast with Retries is operating in an unsolicited retransmission mode, or (iv) the Groupcast with Retries is operating in a Block Acknowledgment mode.

25. An article of manufacture of claim 19, wherein the Groupcast with Retries service is confirmed after the association request and the association response associated with establishing the General Link without using a separate request and response frame exchange to establish the Groupcast with Retries service.

26. An access point to setup a Groupcast with Retries service for use with wireless communications, comprising:
   a processor; and
   a memory including instructions that, when executed, cause the processor to:
      send an association response from the access point to a wireless station, the association response being responsive to a General Link capability of the wireless station received in an association request at the access point from the wireless station; and
      concurrently establish a General Link and the Groupcast with Retries service between the access point and the wireless station based on the association request indicating that the wireless station supports the Groupcast with Retries service.

27. An access point of claim 26, wherein the instructions further cause the processor to tear down the Groupcast with Retries service in a manner implicit to the wireless station being disassociated from the access point.

28. An access point of claim 26, wherein the instructions cause the processor to concurrently establish the General Link and the Groupcast with Retries service between the access point and the wireless station based on the association request indicating the support for the Groupcast with Retries service in association with General Link capabilities in a General Link capabilities element.

29. An access point of claim 26, wherein the Groupcast with Retries service is to enable retransmissions of data from the access point to the wireless station.

30. An access point of claim 29, wherein the instructions further cause the processor to specify in the association response a mode for the retransmissions of the data based on the Groupcast with Retries service, the mode being one of (i) an unsolicited retransmission mode in which the access point retransmits the data to the wireless station using unicast transmissions, or (ii) a Block Acknowledgment mode in which the access point retransmits the data to the wireless station using multicast transmissions.

31. An access point of claim 26, wherein the instructions cause the processor to determine that the wireless station supports the Groupcast with Retries service based on the association request including a General Link-Groupcast with Retries service parameter indicating that the wireless station supports the General Link and the Groupcast with Retries service.

32. An access point of claim 26, wherein the association request is a reassociation request.

33. An access point of claim 26, wherein the instructions cause the processor to establish the Groupcast with Retries service based on the association request and the association response associated with establishing the General Link without using a separate request and response frame exchange to establish the Groupcast with Retries service.

34. An access point of claim 26, wherein the General Link and the Groupcast with Retries service are concurrently established between the access point and the wireless station over a bridged link across a wireless network and a wired network.

* * * * *